US010041292B2

(12) United States Patent
Cooney et al.

(10) Patent No.: US 10,041,292 B2
(45) Date of Patent: Aug. 7, 2018

(54) LOW-POWER RADIO-FREQUENCY RECEIVER

(75) Inventors: Andrew Karl Cooney, Quakertown, PA (US); Jordan H. Crafts, Bethlehem, PA (US); Stuart W. Dejonge, Riegelsville, PA (US); Galen E. Knode, Macungie, PA (US); Jonathan T. Lenz, Emmaus, PA (US); Justin J. Mierta, Allentown, PA (US); Donald R. Mosebrook, Coopersburg, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 1274 days.

(21) Appl. No.: 13/415,537

(22) Filed: Mar. 8, 2012

(65) Prior Publication Data

US 2012/0281606 A1 Nov. 8, 2012

Related U.S. Application Data

(60) Provisional application No. 61/451,960, filed on Mar. 11, 2011, provisional application No. 61/530,799,
(Continued)

(51) Int. Cl.
*E06B 9/38* (2006.01)
*E06B 9/32* (2006.01)
(Continued)

(52) U.S. Cl.
CPC .................. *E06B 9/38* (2013.01); *E06B 9/32* (2013.01); *E06B 9/322* (2013.01); *E06B 9/68* (2013.01);
(Continued)

(58) Field of Classification Search
CPC ............. H04W 52/02; H04W 52/0238; H04W 52/0287
(Continued)

(56) References Cited

U.S. PATENT DOCUMENTS 2,802,523 A    8/1957   Anderle
3,169,006 A    2/1965   Lorentzen et al.
(Continued)

FOREIGN PATENT DOCUMENTS

CN        1531621 A    9/2004
CN     101160444 A    4/2008
(Continued)

OTHER PUBLICATIONS

European Search Report and the Written Opinion of the Search Division dated May 22, 2014 for corresponding European Patent Application No. 14153754.8.
(Continued)

*Primary Examiner* — Hassan Kizou
*Assistant Examiner* — Abdullahi Ahmed
(74) *Attorney, Agent, or Firm* — Amy Yanek; Glen Farbanish

(57) ABSTRACT

A low-power RF receiver has a decreased current consumption. The receiver may be used in control devices, such as battery-powered motorized window treatments and two-wire dimmer switches. The receiver uses an RF sub-sampling technique to check for RF signals and then puts the receiver to sleep for a sleep time that is longer than a packet length of a transmitted packet to conserve battery power. The receiver compares detected RF energy to a threshold that may be increased to decrease the sensitivity of the receiver and increase the battery lifetime. After detecting an RF signal, the receiver is put to sleep for a snooze time that is longer than the sleep time and just slightly shorter than the time between two consecutive transmitted packets.

60 Claims, 17 Drawing Sheets

Related U.S. Application Data filed on Sep. 2, 2011, provisional application No. 61/547,319, filed on Oct. 14, 2011.

(51) Int. Cl.
| | | |
|---|---|---|
| *E06B 9/322* | (2006.01) | |
| *H04W 52/02* | (2009.01) | |
| *E06B 9/70* | (2006.01) | |
| *E06B 9/72* | (2006.01) | |
| *E06B 9/62* | (2006.01) | |
| *E06B 9/262* | (2006.01) | |
| *E06B 9/68* | (2006.01) | |

(52) U.S. Cl.
CPC ............... *E06B 9/70* (2013.01); *E06B 9/72* (2013.01); *H04W 52/0238* (2013.01); *H04W 52/0245* (2013.01); *E06B 9/62* (2013.01); *E06B 2009/2625* (2013.01); *E06B 2009/6818* (2013.01); *E06B 2009/6872* (2013.01); *H04W 52/0287* (2013.01); *Y02A 30/257* (2018.01); *Y02B 80/50* (2013.01); *Y02D 70/00* (2018.01); *Y02D 70/12* (2018.01); *Y02D 70/122* (2018.01)

(58) Field of Classification Search
USPC .......................................................... 370/311
See application file for complete search history.

(56) References Cited

U.S. PATENT DOCUMENTS

| | | |
|---|---|---|
| 4,864,588 A | 9/1989 | Simpson et al. |
| 4,932,037 A | 6/1990 | Simpson et al. |
| 4,995,053 A | 2/1991 | Simpson et al. |
| 5,239,205 A | 8/1993 | Hoffman et al. |
| 5,297,144 A | 3/1994 | Gilbert et al. |
| 5,340,954 A | 8/1994 | Hoffman et al. |
| 5,387,905 A | 2/1995 | Grube et al. |
| 5,454,077 A | 9/1995 | Cheron |
| 5,736,965 A | 4/1998 | Mosebrook et al. |
| 5,793,174 A | 8/1998 | Kovach et al. |
| 5,818,128 A | 10/1998 | Hoffman et al. |
| 5,838,226 A | 11/1998 | Houggy et al. |
| 5,848,054 A | 12/1998 | Mosebrook et al. |
| 5,905,442 A | 5/1999 | Mosebrook et al. |
| 5,982,103 A | 11/1999 | Mosebrook et al. |
| 5,990,646 A | 11/1999 | Kovach |
| 6,057,658 A | 5/2000 | Kovach et al. |
| 6,064,949 A | 5/2000 | Werner et al. |
| 6,181,089 B1 | 1/2001 | Kovach et al. |
| 6,259,218 B1 | 7/2001 | Kovach et al. |
| 6,278,864 B1 * | 8/2001 | Cummins .......... H04W 52/0274 455/260 |
| 6,324,089 B1 | 11/2001 | Symoen et al. |
| 6,369,530 B2 | 4/2002 | Kovach et al. |
| 6,459,938 B1 | 10/2002 | Ito et al. |
| 6,687,487 B1 | 2/2004 | Mosebrook et al. |
| 6,755,230 B2 | 6/2004 | Ulatowski et al. |
| 6,803,728 B2 | 10/2004 | Balasubramaniam et al. |
| 6,807,463 B1 | 10/2004 | Cunningham et al. |
| 6,831,569 B2 | 12/2004 | Wang et al. |
| 6,856,236 B2 | 2/2005 | Christensen et al. |
| 6,859,644 B2 | 2/2005 | Wang |
| 6,879,806 B2 | 4/2005 | Shorty |
| 6,927,547 B2 | 8/2005 | Walko, Jr. et al. |
| 6,980,080 B2 | 12/2005 | Christensen et al. |
| 7,027,416 B1 | 4/2006 | Kriz |
| 7,085,627 B2 | 8/2006 | Bamberger et al. |
| 7,089,066 B2 | 8/2006 | Hesse et al. |
| 7,102,502 B2 | 9/2006 | Autret |
| 7,106,261 B2 | 9/2006 | Nagel et al. |
| 7,126,291 B2 | 10/2006 | Kruse et al. |
| 7,211,968 B2 | 5/2007 | Adamson et al. |
| 7,219,141 B2 | 5/2007 | Bonasia et al. |
| 7,307,542 B1 | 12/2007 | Chandler et al. |
| 7,346,016 B2 | 3/2008 | Nielsen et al. |
| 7,362,285 B2 | 4/2008 | Webb et al. |
| 7,466,090 B2 | 12/2008 | Meewis et al. |
| 7,498,952 B2 | 3/2009 | Newman, Jr. |
| 7,653,017 B2 | 1/2010 | Huylebroeck |
| 7,675,247 B2 | 3/2010 | Okimura |
| 7,723,939 B2 | 5/2010 | Carmen, Jr. |
| 7,768,422 B2 | 8/2010 | Carmen, Jr. et al. |
| 7,783,277 B2 | 8/2010 | Walker et al. |
| 7,860,481 B2 | 12/2010 | Walker et al. |
| 7,940,167 B2 | 5/2011 | Steiner et al. |
| 7,971,086 B2 | 6/2011 | Itkin |
| 8,009,042 B2 | 8/2011 | Steiner et al. |
| 8,193,742 B2 | 6/2012 | Skinner et al. |
| 2002/0043938 A1 | 4/2002 | Lys |
| 2003/0040813 A1 | 2/2003 | Gonzales et al. |
| 2003/0109270 A1 | 6/2003 | Shorty |
| 2004/0052076 A1 | 3/2004 | Mueller et al. |
| 2005/0018644 A1 | 1/2005 | Gessner et al. |
| 2005/0146288 A1 | 7/2005 | Johnson et al. |
| 2005/0215210 A1 | 9/2005 | Saar et al. |
| 2006/0044152 A1 | 3/2006 | Wang |
| 2006/0171332 A1 | 8/2006 | Barnum |
| 2006/0174102 A1 | 8/2006 | Smith et al. |
| 2006/0185799 A1 | 8/2006 | Kates |
| 2006/0192697 A1 | 8/2006 | Quick et al. |
| 2006/0256798 A1 | 11/2006 | Quick et al. |
| 2006/0273970 A1 | 12/2006 | Mosebrook et al. |
| 2006/0284734 A1 | 12/2006 | Newman, Jr. |
| 2007/0089841 A1 | 4/2007 | Rossato et al. |
| 2007/0097895 A1 * | 5/2007 | Keshavarzian ... H04W 52/0219 370/311 |
| 2007/0264963 A1 * | 11/2007 | Srinivasan ........ H04W 52/0245 455/343.2 |
| 2008/0037577 A1 * | 2/2008 | Nagura ................. H04L 1/1657 370/445 |
| 2008/0055073 A1 | 3/2008 | Raneri et al. |
| 2008/0068126 A1 | 3/2008 | Johnson et al. |
| 2008/0068204 A1 | 3/2008 | Carmen et al. |
| 2008/0089266 A1 | 4/2008 | Orsat |
| 2008/0111491 A1 | 5/2008 | Spira |
| 2008/0136261 A1 | 6/2008 | Mierta |
| 2008/0136663 A1 | 6/2008 | Courtney et al. |
| 2008/0192767 A1 * | 8/2008 | Howe et al. ................... 370/449 |
| 2008/0218099 A1 | 9/2008 | Newman |
| 2008/0284327 A1 | 11/2008 | Kang et al. |
| 2009/0103597 A1 | 4/2009 | Choi et al. |
| 2009/0206983 A1 | 8/2009 | Knode et al. |
| 2009/0251352 A1 | 10/2009 | Altonen et al. |
| 2009/0252042 A1 * | 10/2009 | Bradley ........................ 370/241 |
| 2009/0275302 A1 | 11/2009 | Huston et al. |
| 2010/0052574 A1 | 3/2010 | Blakeley et al. |
| 2010/0128645 A1 * | 5/2010 | Lin et al. ...................... 370/311 |
| 2010/0141153 A1 * | 6/2010 | Recker ............... H05B 33/0803 315/149 |
| 2010/0164564 A1 | 7/2010 | Otaka et al. |
| 2010/0244709 A1 | 9/2010 | Steiner et al. |
| 2011/0026441 A1 * | 2/2011 | Diener ........................... 370/260 |
| 2011/0050451 A1 | 3/2011 | Mierta |
| 2011/0150252 A1 * | 6/2011 | Solum .................... H04R 25/55 381/314 |
| 2011/0176465 A1 * | 7/2011 | Panta ................. H04W 52/0235 370/311 |
| 2011/0203748 A1 | 8/2011 | Mullet et al. |
| 2012/0056712 A1 | 3/2012 | Knode |
| 2012/0068686 A1 | 3/2012 | Steiner et al. |
| 2012/0068824 A1 | 3/2012 | Steiner et al. |
| 2012/0133287 A1 | 5/2012 | Steiner et al. |
| 2013/0153162 A1 * | 6/2013 | Blair et al. ..................... 160/310 |
| 2014/0254477 A1 * | 9/2014 | Fricke ............................ 370/328 |
| 2015/0075732 A1 * | 3/2015 | Kirby et al. ................... 160/310 |
| 2015/0083350 A1 * | 3/2015 | Blair et al. ..................... 160/291 |

FOREIGN PATENT DOCUMENTS

| | | |
|---|---|---|
| CN | 201810193 U | 4/2011 |
| CN | 202395513 U | 8/2012 |

(56) References Cited

FOREIGN PATENT DOCUMENTS

| | | |
|---|---|---|
| DE | 19622253 | 9/1997 |
| EP | 0767551 | 4/1997 |
| EP | 0793158 A1 | 9/1997 |
| EP | 1693991 | 8/2006 |
| EP | 2 222 122 | 8/2010 |
| EP | 2222122 | 8/2010 |
| WO | WO-1997/018501 | 5/1997 |
| WO | WO-2001/052515 | 7/2001 |
| WO | WO-02/068786 | 9/2002 |
| WO | WO-2002/071689 | 9/2002 |
| WO | WO 02068786 | 9/2002 |
| WO | WO 2006/091303 | 8/2006 |
| WO | WO-2008/095250 | 8/2008 |

OTHER PUBLICATIONS

Search Report issued by the International Searching Authority dated Jun. 6, 2012 in connection with corresponding PCT application No. PCT/US2012/028337.
European Search Report and the Written Opinion of the Search Division dated Jun. 23, 2014 in related European Patent Application No. 14153748.0-1855.
International Preliminary Report on Patentability dated Sep. 26, 2013 issued in PCT International Application No. PCT/US12/028329.
English translation of Chinese Office Action and Search Report in corresponding Chinese Patent Application No. 2012800126047.
*Low-Power Operation*, Bluetooth: Connect Without Cables by Jennifer Bray and Charles F. Sturman, © 2001 by Prentice Hall PTR, p. 314-331.
Chinese Office Action and Search Report issued in corresponding Chinese Patent Application No. 2014104841646.

* cited by examiner

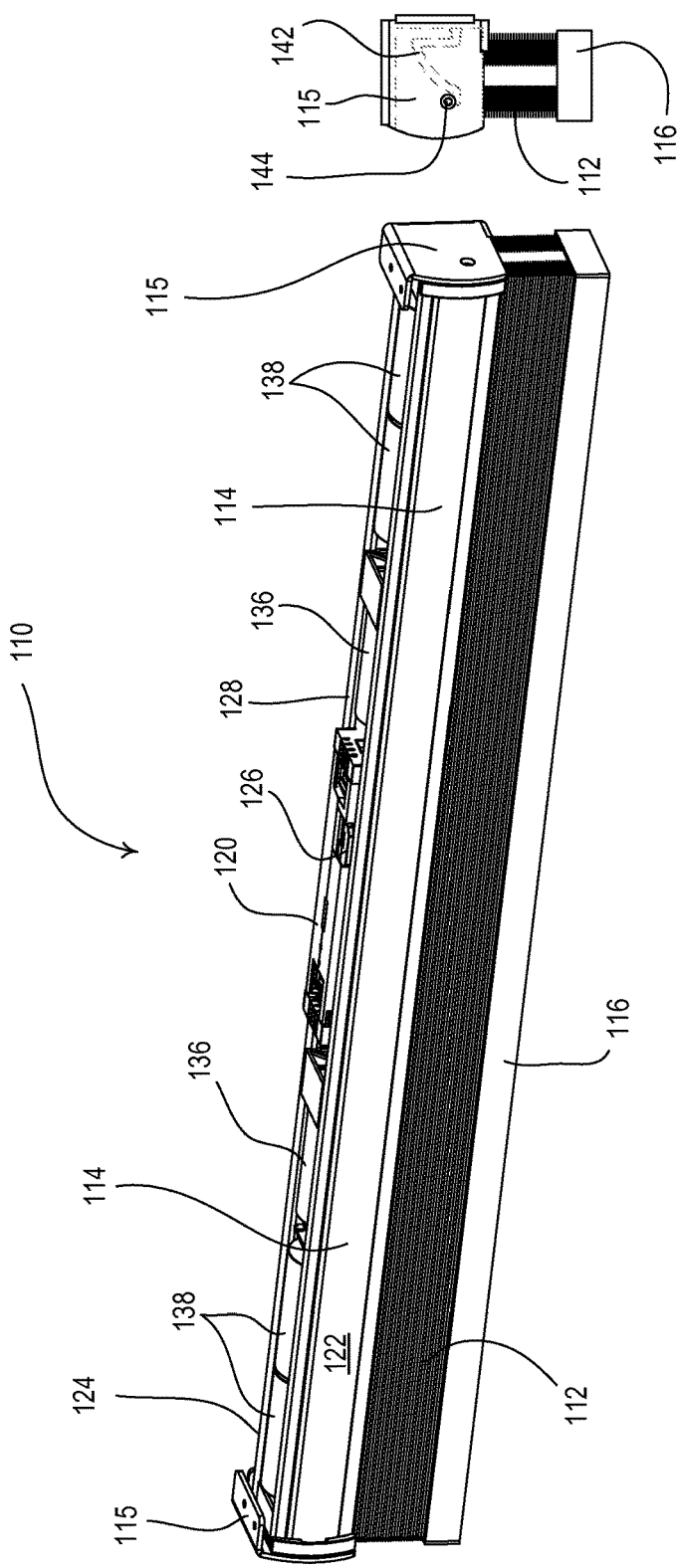

LOW-POWER RADIO-FREQUENCY RECEIVER

CROSS REFERENCES TO RELATED APPLICATIONS

This application is a non-provisional application of commonly-assigned U.S. Provisional Application No. 61/451,960, filed Mar. 11, 2011; U.S. Provisional Application No. 61/530,799, filed Sep. 2, 2011; and U.S. Provisional Application No. 61/547,319, filed Oct. 14, 2011, all entitled MOTORIZED WINDOW TREATMENT, the entire disclosures of which are hereby incorporated by reference.

BACKGROUND OF THE INVENTION

Field of the Invention

The present invention relates to a radio-frequency (RF) load control system, and more specifically, to a low-power RF receiver for use in RF control devices, such as, a battery-powered motorized window treatment or a two-wire dimmer switch.

Description of the Related Art

Control systems for controlling electrical loads, such as lights, motorized window treatments, and fans, are known. Such control systems often use the transmission of radio-frequency (RF) signals to provide wireless communication between the control devices of the system. The prior art lighting control systems include wireless remote controls, such as, table-top and wall-mounted master controls (e.g., keypads) and car visor controls. The master controls of the prior art lighting control system each include a plurality of buttons and transmit RF signals to load control devices (such as dimmer switches) to control the intensities of controlled lighting loads. The master controls may also each include one or more visual indicators, e.g., light-emitting diodes (LEDs), for providing feedback to users of the lighting control system. The car visor controls are able to be clipped to the visor of an automobile and include one or more buttons for controlling the lighting loads of the lighting control system. An example of a prior art RF lighting control system is disclosed in commonly-assigned U.S. Pat. No. 5,905,442, issued on May 18, 1999, entitled METHOD AND APPARATUS FOR CONTROLLING AND DETERMINING THE STATUS OF ELECTRICAL DEVICES FROM REMOTE LOCATIONS, the entire disclosure of which is hereby incorporated by reference.

Some of the wireless control devices of the prior art lighting control systems are powered by batteries, which have limited lifetimes that are dependent upon the current drawn from the batteries as well as how often the control devices are used. The RF circuitry (i.e., the transmitters, receivers, or transceivers) of the wireless control devices is one of the primary consumers of battery power in the devices. Therefore, typical prior art battery-powered wireless control devices have attempted to limit the amount of time that the control devices are actively transmitting RF signals. In addition, when the prior art battery-powered wireless control devices are not presently transmitting or receiving RF signals, the RF circuitry is put into a sleep mode in which these circuits drawn less current from the batteries. The RF circuitry is periodically woken up to determine if any RF signals are being received. Thus, the amount of time that the RF circuits are awake as compared to the amount of time that the RF circuits are asleep affects the amount of current drawn from the batteries as well as the lifetime of the batteries.

U.S. Pat. No. 7,869,481, issued Dec. 28, 2010, entitled LOW POWER RF CONTROL SYSTEM, describes a motorized window treatment having an RF receiver, for allowing the motorized window treatment to be controlled from a handheld RF remote control. The remote control transmits command signals that each include a pre-sync pulse time and subsequent message data. To determine if an RF command signal is being transmitted by the RF remote control, the RF receiver of the motorized window treatment periodically wakes up for a short period of time at a rate that ensures that the RF receiver checks for RF signals at least two times during the amount of time required to transmit the pre-sync pulse time of each control signal. For example, if the pre-sync pulse time is 30 milliseconds, the RF receiver wakes up at least two times each 30 milliseconds. Thus, the amount of time that the RF circuitry is awake as compared to being in the sleep mode is dependent upon a characteristic of the command signals, i.e., the length of the pre-sync pulse time, and must be shorter than the pre-sync pulse time. Therefore, the sleep time cannot be increased (to thus decrease the power consumption of the RF receiver) without increasing the pre-sync pulse time, which will decrease the throughput of the system. In addition, the length of the command signals may be limited by national or regional standards.

Therefore, there is a need for a low-power RF receiver that may be used in battery-powered control devices to lead to longer battery lifetimes. Particularly, there is a need for a low-power RF receiver that is able to check for RF signals at a rate that is not limited by a characteristic of each of the transmitted RF signals.

SUMMARY OF THE INVENTION

The present invention provides a low-power radio-frequency (RF) receiver that is characterized by a decreased current consumption over prior art RF receivers. The low-power RF receiver may be used in, for example, a battery-powered control device, such as a motorized window treatment that controls the position of a covering material that is adapted to hang in front of an opening, such as a window. As a result of using the low-power RF receiver, the battery-powered motorized window treatment has a much longer (and more practical) lifetime than typical prior art battery-powered motorized window treatments (e.g., approximately three years). The low-power RF receiver is operable to receive RF signals from various types of RF transmitters, such as, for example, battery-powered remote controls, occupancy sensors, vacancy sensors, daylight sensors, temperature sensors, humidity sensors, security sensors, proximity sensors, keypads, key fobs, cell phones, smart phones, tablets, personal digital assistants, personal computers, time-clocks, audio-visual controls, safety devices, central control transmitters, or any combination of these input devices.

The low-power RF receiver is used in a load control system having an RF transmitter that transmits a number of sequential packets via RF signals with each packets including the same command and having a packet length. The low-power RF receiver is operable to use an RF sub-sampling technique to check for the RF signals and then put the RF receiver to sleep for a sleep time that is longer than the packet length of the packets to thus conserve battery power and lengthen the lifetime of the batteries. The low-power RF receiver compares detected RF energy to a detect threshold that may be increased to decrease the sensitivity of the low-power RF receiver and increase the lifetime of the batteries. After detecting that an RF signal is being transmitted, the low-power RF receiver is put to sleep for a snooze time period that is longer than the sleep time and just slightly shorter than the time between two consecutive transmitted packets to further conserve battery power. In addition, The low-power RF receiver may be responsive to RF signals transmitted at a different frequency than the frequency to which other control devices of the load control system are responsive to limit the amount of time that the RF receiver wakes up to process incoming RF signals and thus conserve battery power.

According to an embodiment of the present invention, a load control device for controlling an electrical load receiving power from a power source in response to RF signals transmitted by an RF transmitter comprises a low-power RF receiver. The RF transmitter is adapted to transmit a number of sequential digital messages at a predetermined transmission rate, where each of the digital messages including the same command and characterized by a packet length. The load control device comprises an RF receiver adapted to receive at least one of the sequential digital messages, and a controller operatively coupled to the RF transceiver for receiving the at least one of the sequential digital messages and controlling the load in response to the received digital message. The RF receiver is enabled for a sample time period to determine if the RF transmitter is transmitting one of the digital messages. The RF receiver enters a sleep mode for a sleep time period between consecutive sample time periods. The sleep time period of the RF receiver is longer than the packet length of each of the digital messages.

According to another embodiment of the present invention, an RF communication system comprises an RF transmitter adapted to transmit a number of sequential digital messages at a predetermined transmission rate, and an RF receiver adapted to receive at least one of the sequential digital messages. Each of the digital messages including the same command and characterized by a packet length. The RF receiver is enabled for a sampling time to determine if the RF transmitter is transmitting one of the digital messages, and enters a sleep mode for a sleep time period between consecutive sample time periods. The sleep time period of the RF receiver is longer than the packet length of each of the digital messages.

According to another embodiment of the present invention, a wireless signal receiver comprises a wireless receiver circuit for detecting transmitted signals transmitted in a predetermined number of packets, where each packet comprises the same data, there being a packet time and a time between packets substantially longer than the packet time. The wireless signal receiver also comprises a control circuit for turning on the wireless receiver circuit for an on-time, where the on-time is substantially less than an off-time of the wireless receiver circuit. The on-time of the wireless receiver circuit is also substantially less than the packet time and the off-time between on-times being less than the time between packets. The off-time is selected so that within the plurality of packets, the on-time will coincide with the packet time to ensure that the wireless receiver circuit detects at least one packet during the transmission of the predetermined number of packets if packets are being transmitted.

In addition, a method of communicating digital messages in a load control system is also described herein. The method comprises: (1) transmitting a number of sequential digital messages at a predetermined transmission rate, each of the digital messages including the same command and characterized by a packet length; (2) enabling an RF receiver for a sample time period to determine if the RF transmitter is transmitting one of the digital messages; and (3) putting the RF receiver in a sleep mode for a sleep time period between consecutive sample time periods. The sleep time period of the RF receiver is longer than the packet length of each of the digital messages.

According to another aspect of the present invention, a wireless signal receiver circuit for detecting wireless control signals has an on/off operation to conserve power. The wireless signal receiver circuit comprises a control circuit, and a wireless receiver having an on state when it consumes power and an off state when it consumes less power than consumed in the on state. The on state has a duration substantially shorter than the off state, whereby the wireless receiver receives wireless control signals during the on state to be processed by the control circuit. The wireless control signals are sent in packets with a packet time such that there is a predefined time between packets. The wireless receiver is operable to periodically be in the on state for a sample time substantially less than the packet time to detect a wireless control signal, whereby upon detecting a first packet during the sample time, the wireless receiver is operable to enter the off state to conserve power for an amount of time slightly less than the predefined time between packets, to subsequently turn on and remain on until a succeeding packet starts to be received, and to turn off after the succeeding packet is fully received.

According to another embodiment of the present invention, a battery-powered wireless device comprises: a control circuit having an on state when it consumes power and an off state when it consumes less power than consumed in the on state, and a wireless receiver circuit operable to periodically check for wireless signals. The wireless receiver circuit has a detect threshold wherein the wireless receiver circuit is operable to determine whether a wireless signal exceeds the detect threshold. The receiver circuit is operable to cause the control circuit to be in on state in response to determining that a wireless signal exceeds the detect threshold. The control circuit is further operable to adjust the detect threshold of the wireless receiver circuit whereby the detect threshold can be increased to prevent noise signals from causing the wireless receiver circuit to turn on the control circuit thereby conserving battery power.

A system for conserving battery power of a battery powered wireless signal receiver is also described herein. The system comprises a wireless signal receiver that periodically turns on to determine if a wireless signal is being transmitted and is capable of receiving on any of multiple channels. The wireless signal receiver includes a control circuit that determines if the wireless signal is intended for the wireless signal receiver. The transceiver circuit retransmits the wireless signals and determines a number of transmitted wireless signals. If the number exceeds a threshold amount, the transceiver circuit communicates with the wireless signal receiver to change the channel of communication to an alternate channel and retransmits wireless signals intended for the wireless signal receiver on the alternate channel, whereby the wireless signal receiver will receive fewer wireless signals on the alternate channel, thereby remaining on for less time and reducing battery power consumption.

According to another embodiment of the present invention, a wireless control system comprises: (1) a first wireless signal receiver capable of receiving on wireless signals on a first channel; (2) a second wireless signal receiver that periodically turns on to determine if wireless signals are being transmitted, the second wireless signal receiver being capable of receiving on wireless signals on a second channel; and (3) a transceiver circuit for retransmitting said wireless signals, said transceiver circuit operable to receive a first wireless signal on the first channel and to determine that the first wireless signal contains control information intended for the second wireless signal receiver. The transceiver circuit is operable to change its channel of communication from the first channel to the second channel, and transmit the control information in a second wireless signal to the second wireless signal receiver on the second channel.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which:

FIG. 2 is a perspective view of the battery-powered motorized window treatment of FIG. 1 in a full-closed position;

FIG. 3 is a right side view of the battery-powered motorized window treatment of FIG. 1;

DETAILED DESCRIPTION OF THE INVENTION

Figure 1:
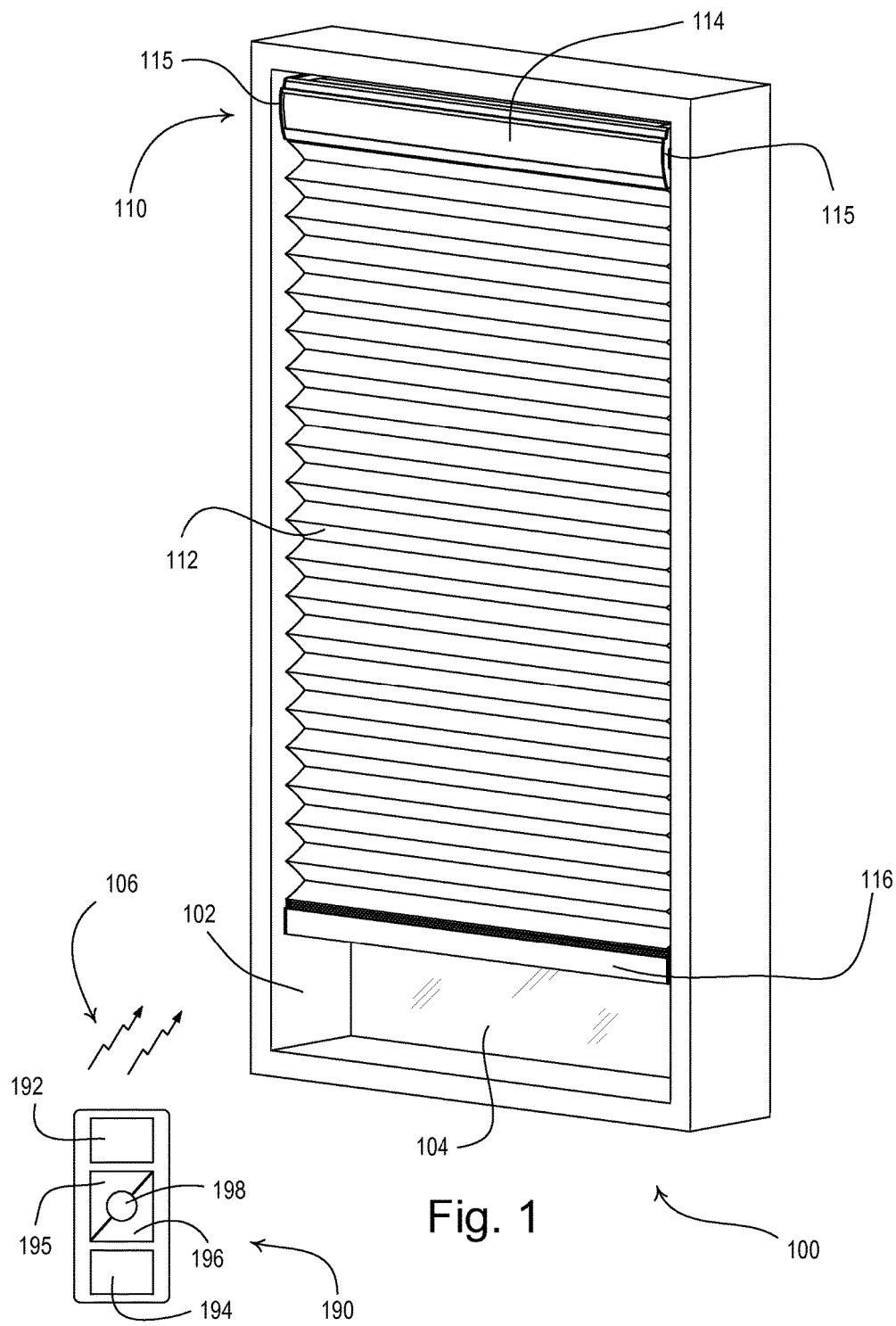
FIG. 1 is a perspective view of a motorized window treatment system having a battery-powered motorized window treatment and a remote control according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a perspective view of a motorized window treatment system 100 having a battery-powered motorized window treatment 110 mounted in an opening 102, for example, in front of a window 104, according to a first embodiment of the present invention. The battery-powered motorized window treatment 110 comprises a covering material, for example, a cellular shade fabric 112 as shown in FIG. 1. The cellular shade fabric 112 has a top end connected to a headrail 114 (that extends between two mounting plates 115) and a bottom end connected to a weighting element 116. The mounting plates 115 may be connected to the sides of the opening 102 as shown in FIG. 1, such that the cellular shade fabric 112 is able to hang in front of the window 104, and may be adjusted between a fully-open position $P_{FULLY-OPEN}$ and a fully-closed position $P_{FULLY-CLOSED}$ to control the amount of daylight entering a room or space. Alternatively, the mounting plates 115 of the battery-powered motorized window treatment 110 could be mounted externally to the opening 102 (e.g., above the opening) with the shade fabric 112 hanging in front of the opening and the window 104. In addition, the battery-powered motorized window treatment 110 could alternatively comprise other types of covering materials, such as, for example, a plurality of horizontally-extending slats (i.e., a Venetian or Persian blind system), pleated blinds, a roller shade fabric, or a Roman shade fabric.

The motorized window treatment system 100 comprises a radio-frequency (RF) remote control 190 for transmitting RF signals 106 to the motorized window treatment 110 using, for example, a frequency-shift keying (FSK) modulation technique, to thus for control the operation of the motorized window treatment. Specifically, the RF remote control 190 is operable to transmit digital messages including commands to control the motorized window treatment 710 via the RF signals 106 in response to actuations of a plurality of buttons, e.g., an open button 192, a close button 194, a raise button 195, a lower button 196, and a preset button 198. The motorized window treatment 110 controls the cellular shade fabric 112 to the fully-open position $P_{FULLY-OPEN}$ and the fully-closed position $P_{FULLY-CLOSED}$ in response to actuations of the open button 192 and the close button 194 of the remote control 190, respectively. The motorized window treatment 110 raises and lowers the cellular shade fabric 112 in response to actuations of the raise button 195 and the lower button 196, respectively. The motorized window treatment 110 controls the cellular shade fabric 112 to a preset position $P_{PRESET}$ in response to actuations of the preset button 198.

FIG. 2 is a perspective view and FIG. 3 is a right side view of the battery-powered motorized window treatment 110 with the cellular shade fabric 112 in the fully-open position $P_{FULLY-OPEN}$. The motorized window treatment 110 comprises a motor drive unit 120 for raising and lowering the weighting element 116 and the cellular shade fabric 112 between the fully-open position $P_{FULLY-OPEN}$ and the fully-closed position $P_{FULLY-CLOSED}$. By controlling the amount of the window 104 covered by the cellular shade fabric 112, the motorized window treatment 110 is able to control the amount of daylight entering the room. The headrail 114 of the motorized window treatment 110 comprises an internal side 122 and an opposite external side 124, which faces the window 104 that the shade fabric 112 is covering. The motor drive unit 120 comprises an actuator 126, which is positioned adjacent the internal side 122 of the headrail 114 may may be actuated when a user is configuring the motorized window treatment 110. The actuator 126 may be made of, for example, a clear material, such that the actuator may operate as a light pipe to conduct illumination from inside the motor drive unit 120 to thus be provide feedback to the user of the motorized window treatment 110. The motor drive unit 120 is operable to determine a target position $P_{TARGET}$ for the weighting element 116 in response to commands included in the IR signals received from the remote control 190 and to subsequently control a present position $P_{PRES}$ of the weighting element to the target position $P_{TARGET}$. As shown in FIG. 2A, a top side 128 of the headrail 114 is open, such that the motor drive unit 120 may be positioned inside the headrail and the actuator 126 may protrude slightly over the internal side 122 of the headrail.

Figure 4:
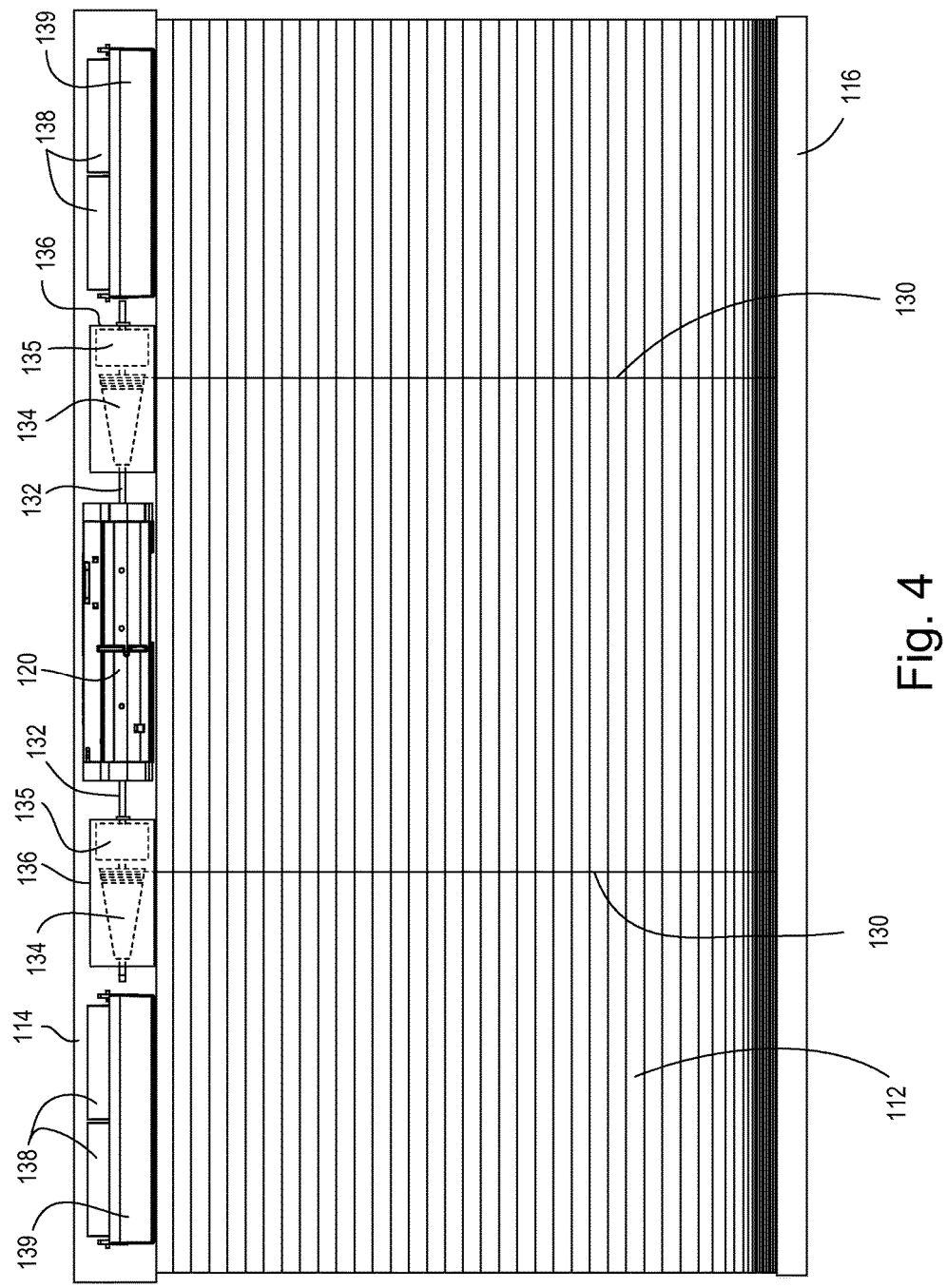
FIG. 4 is a front view of the battery-powered motorized window treatment of FIG. 1.

FIG. 4 is a front view of the battery-powered motorized window treatment 110 with the internal side 122 of the headrail 114 removed to show the motor drive unit 120. The motorized window treatment 110 comprises lift cords 130 that extend from the headrail 114 to the weighting element 116 for allowing the motor drive unit 120 to raise and lower the weighting element. The motor drive unit 120 includes an internal motor 150 (FIG. 5) coupled to drive shafts 132 that extend from the motor on each side of the motor and are each coupled to a respective lift cord spool 134. The lift cords 130 are windingly received around the lift cord spools 134 and are fixedly attached to the weighting element 116, such that the motor drive unit 120 is operable to rotate the drive shafts 132 to raise and lower the weighting element. The motorized window treatment 110 further comprises two constant-force spring assist assemblies 135, which are each coupled to the drive shafts 132 adjacent to one of the two lift cord spools 134. Each of the lift cord spools 134 and the adjacent constant-force spring assist assembly 135 are housed in a respective lift cord spool enclosure 136 as shown in FIG. 3. Alternatively, the motor drive unit 120 could be located at either end of the headrail 114 and the motorized window treatment 110 could comprise a single drive shaft that extends along the length of the headrail and is coupled to both of the lift cord spools 134.

The battery-powered motorized window treatment 110 also comprises a plurality of batteries 138 (e.g., four D-cell batteries), which are electrically coupled in series. The seris-combination of the batteries 138 is coupled to the motor drive unit 120 for powering the motor drive unit. The batteries 138 are housed inside the headrail 114 and thus out of view of a user of the motorized window treatment 110. Specifically, the batteries 138 are mounted in two battery holders 139 located inside the headrail 114, such that there are two batteries in each battery holder as shown in FIG. 4. According to the embodiments of the present invention, the batteries 138 provide the motorized window treatment 110 with a practical lifetime (e.g., approximately three years), and are typical "off-the-shelf" batteries that are easy and not expensive to replace. Alternatively, the motor drive unit 120 could comprise more batteries (e.g., six or eight) coupled in series or batteries of a different kind (e.g., AA batteries) coupled in series.

Figure 5:
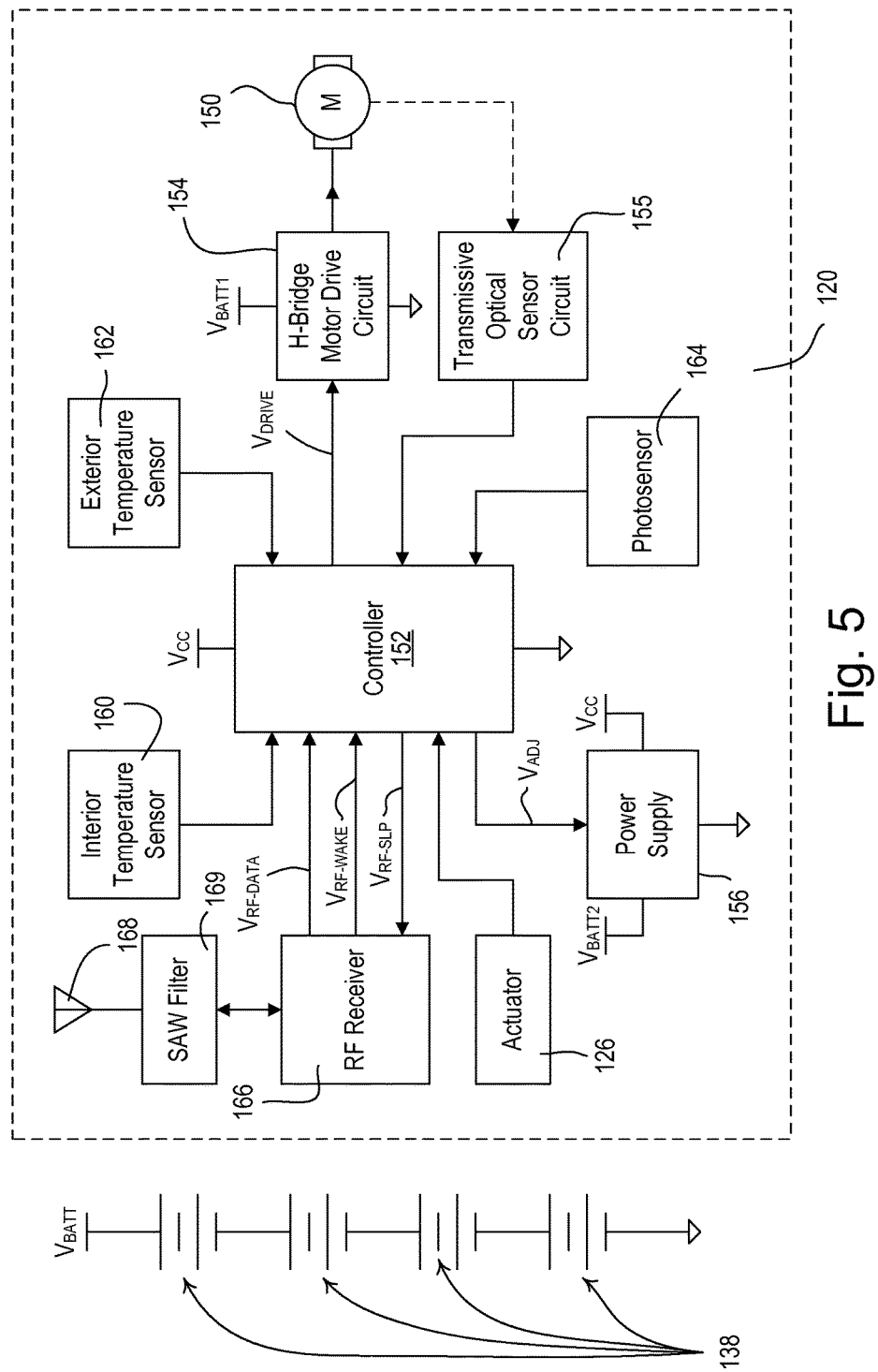
FIG. 5 is a simplified block diagram of a motor drive unit of the battery-powered motorized window treatment of FIG. 1.

FIG. 5 is a simplified block diagram of the motor drive unit 120 of the battery-powered motorized window treatment 110. The motor drive unit 120 comprises a controller 152 for controlling the operation of the motor 150, which may comprise, for example, a DC motor. The controller 152 may comprise, for example, a microprocessor, a programmable logic device (PLD), a microcontroller, an application specific integrated circuit (ASIC), a field-programmable gate array (FPGA), or any suitable processing device or control circuit. The controller 152 is coupled to an H-bridge motor drive circuit 154 for driving the motor 150 via a set of drive signals $V_{DRIVE}$ to control the weighting element 116 and the cellular shade fabric 112 between the fully-open position $P_{FULLY-OPEN}$ and the fully-closed position $P_{FULLY-CLOSED}$. The controller 152 is operable to rotate the motor 150 at a constant rotational speed by controlling the H-bridge motor drive circuit 154 to supply a pulse-width modulated (PWM) drive signal having a constant duty cycle to the motor. The controller 152 is able to change the rotational speed of the motor 150 by adjusting the duty cycle of the PWM signal applied to the motor and to change the direction of rotation of the motor by changing the polarity of the PWM drive signal applied to the motor.

The controller 152 receives information regarding the rotational position and direction of rotation of the motor 150 from a rotational position sensor, such as, for example, a transmissive optical sensor circuit 155. The rotational position sensor may also comprise other suitable position sensors or sensor arrangements, such as, for example, Hall-effect, optical, or resistive sensors. The controller 152 is operable to determine a rotational position of the motor 150 in response to the transmissive optical sensor circuit 155, and to use the rotational position of the motor to determine a present position $P_{PRES}$ of the weighting element 116. The controller 152 may comprise an internal non-volatile memory (or alternatively, an external memory coupled to the controller) for storage of the present position $P_{PRES}$ of the shade fabric 112, the fully open position $P_{FULLY-OPEN}$, and the fully closed position $P_{FULLY-CLOSED}$. The operation of the H-bridge motor drive circuit 154 and the use of sensor devices to track the direction and speed of the motor drive unit 120 is described in greater detail in commonly-assigned U.S. Pat. No. 5,848,634, issued Dec. 15, 1998, entitled MOTORIZED WINDOW SHADE SYSTEM, and commonly-assigned U.S. Pat. No. 6,497,267, issued Dec. 24, 2002, entitled MOTORIZED WINDOW SHADE WITH ULTRAQUIET MOTOR DRIVE AND ESD PROTECTION, the entire disclosures of which are herein incorporated by reference.

A user of the window treatment system 100 is able to adjust the position of the weighting element 116 and the cellular shade fabric 112 by using the remote control 190 to transmit commands to the motor drive unit 120 via the RF signals 106. The motor drive unit 120 comprises an RF receiver 166 coupled to an antenna 168 (e.g., a wire antenna) for receiving the RF signals 106. The antenna 168 is coupled to the RF receiver 166 via a surface acoustic wave (SAW) filter 169 (e.g., part number B3580 as manufactured by Epcos AG), which acts to filter RF noise as will be described in greater detail below. The RF receiver 166 is operable to provide an RF data control signal $V_{RF-DATA}$ representative of the received RF signals 106 to a controller 152, such that the controller is operable to control the H-bridge motor drive circuit 154 in response to the received signals.

Figure 6A:
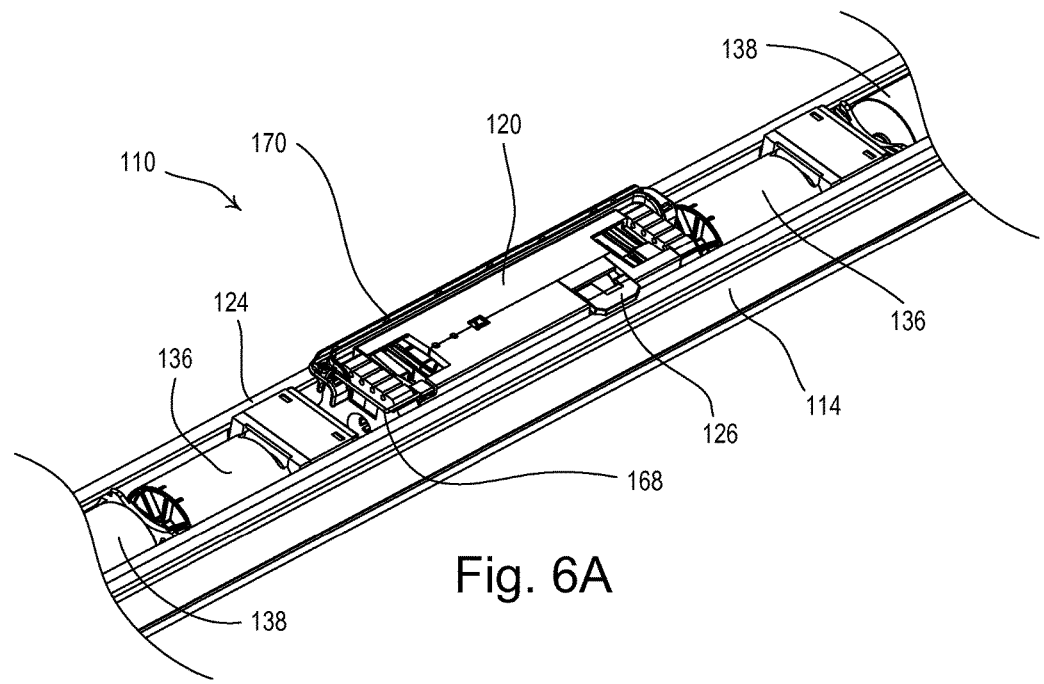
FIGS. 6A and 6B are partial perspective views of the motor drive unit and a headrail of the motorized window treatment of FIG. 1.
Figure 6B:
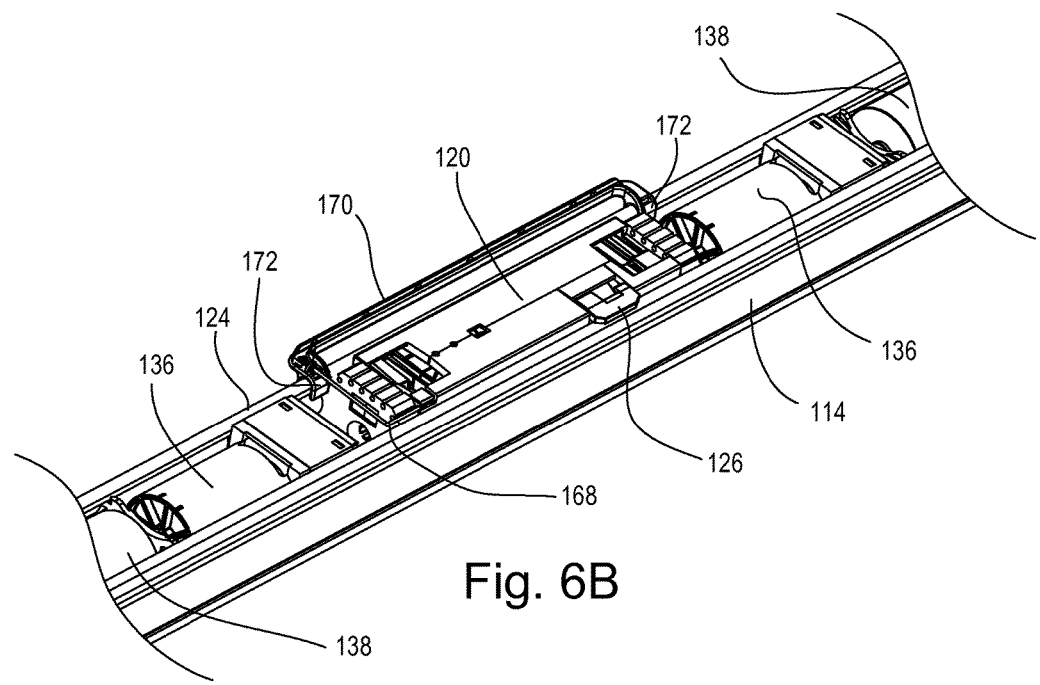

FIGS. 6A and 6B are partial perspective views of the motor drive unit 120 and the headrail 114 of the motorized window treatment 110. The antenna 168 is adapted to extend from the motor drive unit 168 and is received in an elongated antenna wire carrier 170. As shown in FIG. 6A, the antenna wire carrier 170 may be located in a first position immediately adjacent the motor drive unit 120 above the external side 124 of the headrail 114. The antenna wire carrier 170 may be removed from the first position and re-located into a second position in which the antenna 168 is slightly offset (e.g., by a distance of approximately 0.4 inch) from the motor drive unit 120 as shown in FIG. 6B. The antenna wire carrier 170 comprises clips 172 that are adapted to snap onto the top edge of the external side 124 of the headrail 114 in the second position. The antenna wire carrier 170 provides a mechanical means for adjusting the RF sensitivity of the RF receiver 166 and thus the power consumed by the RF receiver 166. When the antenna wire carrier 170 is located in the second position (as shown in FIG. 6B), the RF receiver 166 has an increased RF sensitivity (e.g., by approximately 3 dB), and is thus operable to receive more RF signals 106 than if the antenna wire carrier was located in the first position (as shown in FIG. 6A). However, the increased RF sensitivity means that the RF receiver 166 will consume more power. Therefore, the antenna wire carrier 170 may be moved to the first position in which the RF receiver 166 has a reduced RF sensitivity, but consumes less power.

As shown in FIG. 5, the motor drive unit 120 receives power from the series-coupled batteries 138, which provide a battery voltage $V_{BATT}$. For example, the batteries 138 may comprise D-cell batteries having rated voltages of approximately 1.5 volts, such that the battery voltage $V_{BATT}$ has a magnitude of approximately 6 volts. The H-bridge motor drive circuit 154 receives the battery voltage $V_{BATT}$ for driving the motor 150. In order to preserve the life of the batteries 138, the controller 152 may be operable to operate in a sleep mode when the motor 150 is idle.

The motor drive unit 120 further comprises a power supply 156 (e.g., a linear regulator) that receives the battery voltage $V_{BATT}$ and generates a DC supply voltage $V_{CC}$ for powering the controller 152 and other low-voltage circuitry of the motor drive unit. The controller 152 is coupled to the power supply 156 and generates a voltage adjustment control signal $V_{ADJ}$ for adjusting the magnitude of the DC supply voltage $V_{CC}$ between a first nominal magnitude (e.g., approximately 2.7 volts) and a second increased magnitude (e.g., approximately 3.3 volts). The power supply 156 may comprise, for example, an adjustable linear regulator having one or more feedback resistors that are switched in and out of the circuit by the controller 152 to adjust the magnitude of the DC supply voltage $V_{CC}$. The controller 152 may adjust the magnitude of the DC supply voltage $V_{CC}$ to the second increased magnitude while the controller is driving the motor drive circuit 154 to rotate the motor 150 (since the controller may require an increased supply voltage to drive the motor drive circuit). The controller 152 adjusts the magnitude of the DC supply voltage $V_{CC}$ to the first nominal magnitude when the controller is not controlling the motor drive circuit 154 to rotate the motor 150 (e.g., when the controller is in the sleep mode). The magnitude of the idle currents drawn by the controller 152, the IR receiver 166, and other low-voltage circuitry of the motor drive unit 120 may be significantly smaller when these circuits are powered by the first nominal magnitude of the DC supply voltage $V_{CC}$.

The controller 152 is operable to determine that the magnitude of the battery voltage $V_{BATT}$ is getting low and to operate in a low-battery mode when the magnitude of the battery voltage $V_{BATT}$ drops below a first predetermined battery-voltage threshold $V_{B-TH1}$ (e.g., approximately 1.0 volts per battery). For example, the controller 152 may control the motor drive circuit 154 so that the motor 150 is operated at a reduced speed (e.g., at half speed) to conserve battery power when the controller 152 is operating in the low-battery mode. This would serve as an indication to a consumer that the battery voltage $V_{BATT}$ is low and the batteries 138 need to be changed.

When the magnitude of the battery voltage $V_{BATT}$ drops below a second predetermined battery-voltage threshold $V_{B-TH2}$ (less than the first predetermined battery-voltage threshold $V_{B-TH1}$, e.g., approximately 0.9 V per battery) while operating in the low-battery mode, the controller 152 may shut down electrical loads in the motor drive unit 120 (e.g., by disabling the IR receiver 166 and other low-voltage circuitry of the motor drive unit) and prevent movements of the cellular shade fabric 112 except to allow for at least one additional movement of the cellular shade fabric to the fully-open position $P_{FULLY-OPEN}$. Having the cellular shade fabric 112 at the fully-open position $P_{FULLY-OPEN}$ allows for easy replacement of the batteries. The second predetermined battery-voltage threshold $V_{B-TH2}$ may be sized to provide enough reserve energy in the batteries 138 to allow for the at least one additional movement of the cellular shade fabric 112 and the weighting element 116 to the fully-open position $P_{FULLY-OPEN}$.

When the magnitude of the battery voltage $V_{BATT}$ drops below a third predetermined battery-voltage threshold $V_{B-TH3}$ (less than the second predetermined battery-voltage threshold $V_{B-TH2}$, e.g., approximately 0.8 V per battery), the controller 152 may be operable to shut itself down such that no other circuits in the motor drive unit 120 consume any power in order to protect against any potential leakage of the batteries 138.

The motor drive unit 120 comprises an alternate (or supplemental) power source, such as a backup battery, e.g., a long-lasting battery (not shown), which generates a backup supply voltage $V_{BACKUP}$ (e.g., approximately 3.0 volts) for powering the controller 152. The alternate power source provides the controller 152 with power when the batteries 138 are removed for replacement, or otherwise depleted, such that the position data relating to the position of the window treatment that is stored in the memory of the controller 152 is maintained. Alternatively, a large bus capacitor or an ultra-capacitor can be coupled to the controller 152 (rather than the backup battery), so that even when the batteries 138 are removed for replacement, an adequate charge will remain in the bus capacitor or ultra capacitor to maintain adequate voltage to keep the controller 152 charged for the period of time necessary to replace batteries 138 and thereby prevent loss of stored data in the memory of the controller.

These embodiments allow the motor drive unit 120 to keep track of the position of the weighting element 116 of the window treatment 110 even when the batteries 138 are removed and the window treatment is manually operated (i.e., pulled). In such embodiments, the controller 152 continues to receive signals from transmissive optical sensor circuit 155, even when the batteries 138 are removed. Because it remains powered, the controller 152 will continue to calculate the position of the window treatment 110 when manually adjusted. It should be pointed out that the window treatment 110 of the present invention allows a user at any time to manually adjust the position of the window treatment, and that the position of the window treatment is always calculated both when the window treatment is moved by the motor or manually.

As shown in FIG. 5, the motor drive unit 120 comprises an internal temperature sensor 160 that is located adjacent the internal side 122 of the headrail 114 (i.e., a room-side temperature sensor), and a external temperature sensor 162 that is located adjacent the external side 124 of the headrail (i.e., a window-side temperature sensor). The room-side temperature sensor 160 is operable to measure an interior temperature inside the room in which the motorized window treatment 110 is installed, while the external temperature sensor 162 is operable to measure an exterior temperature between the headrail 114 and the window 104. The motor drive unit 120 further comprises a photosensor 164, which is located adjacent the external side 124 of the headrail 114, and is directed to measure the amount of sunlight that may be shining on the window 104. Alternatively, the exterior (window-side) temperature sensor 162 may be implemented as a sensor label (external to the headrail 114 of the battery powered motorized window treatment 110) that is operable to be affixed to an inside surface of a window. The sensor label may be coupled to the motor drive unit 120 through low voltage wiring (not shown).

The controller 152 receives inputs from the internal temperature sensor 160, the external temperature sensor 162, and the photosensor 164. The controller 152 may operate in an eco-mode to control the position of the weighting element 116 and the cellular shade fabric 112 in response to the internal temperature sensor 160, the external temperature sensor 162, and the photosensor 164, so as to provide energy savings. When operating in the eco-mode, the controller 152 adjusts the amount of the window 104 covered by the cellular shade fabric 112 to attempt to save energy, for example, by reducing the amount of electrical energy consumed by other control systems in the building in which the motorized window treatment 110 is installed. For example, the controller 152 may adjust the present position $P_{PRES}$ of the weighting element 116 to control the amount of daylight entering the room in which the motorized window treatment 110 is installed, such that lighting loads in the room may be turned off or dimmed to thus save energy. In addition, the controller 152 may adjust the present position $P_{PRES}$ of the weighting element 116 to control the heat flow through the window 104 in order to lighten the load on a heating and/or cooling system, e.g., a heating, air-conditioning, and ventilation (HVAC) system, in the building in which the motorized window treatment 110 is installed.

The motorized window treatment 110 and the RF remote control 190 may be easily programmed, such that the motorized window treatment 110 is responsive to actuations of the buttons 192-198 of the remote control 190. First, the user may associate the remote control 190 with the motorized window treatment 110 by actuating the actuator 126 on the motor drive unit 120 and then pressing and holding, for example, the close button 194 on the remote control for a predetermined amount of time (e.g., approximately five seconds). After the remote control 190 is associated with the motorized window treatment 110, the motorized window treatment is responsive to the RF signals 106 transmitted by the remote control. The user may program the preset position $P_{PRESET}$ of the motorized window treatment 110 by actuating the raise and lower buttons 195, 196 of the remote control 190 to adjust the position of the weighting element 116 to the desired preset position, and then pressing and holding the preset button 198 for the predetermined amount of time.

The user may also use the remote control 190 to program the upper and lower limits (i.e., the fully-open position $P_{FULLY-OPEN}$ and the fully-closed position $P_{FULLY-CLOSED}$) of the motorized window treatments 110. To enter a limit programming mode, the user actuates the actuator 126 on the motor drive unit 120, and then simultaneously presses and holds the open button 192 and the raise button 195 of the remote control 190 for the predetermined amount of time (i.e., approximately five seconds). To program the lower limit, the user actuates the raise and lower buttons 195, 196 of the remote control 190 to adjust the position of the weighting element 116 to the desired fully-closed position $P_{FULLY-CLOSED}$, and then presses the close button 194 for the predetermined amount of time. To program the upper limit, the user actuates the raise and lower buttons 195, 196 of the remote control 190 to adjust the position of the weighting element 116 to the desired fully-open position $P_{FULLY-OPEN}$, and then presses the open button 192 for the predetermined amount of time. The user can then press and hold the open button 192 and the raise button 195 of the remote control 190 for the predetermined amount of time to exit the limit programming mode.

The RF receiver 166 and the controller 152 are both able to be put in a sleep mode (i.e., low-power mode) to conserve battery power. During the sleep mode, the RF receiver 166 is operable to wake-up periodically to sample (e.g., listen for) RF energy (i.e., RF signals 106) as will be described in greater detail below. In the event that the RF receiver 166 does detect the presence of any RF signals 106, the RF receiver is operable to wake up the controller 152 via an RF wake up signal $V_{RF\_WAKE}$, such that the controller can begin processing the received RF signal. In particular, the RF receiver 166 wakes up the controller 152 in response to detecting any RF energy within a particular frequency band. Each time that the controller 152 wakes up in response to the RF wake up signal $V_{RF\_WAKE}$, additional power is consumed by the controller (since the controller is fully powered when awake). This additional power consumption reduces the life of the batteries 138, and as a result, it is optimal that the RF receiver 166 only wake up the controller 152 when necessary.

Figure 7:
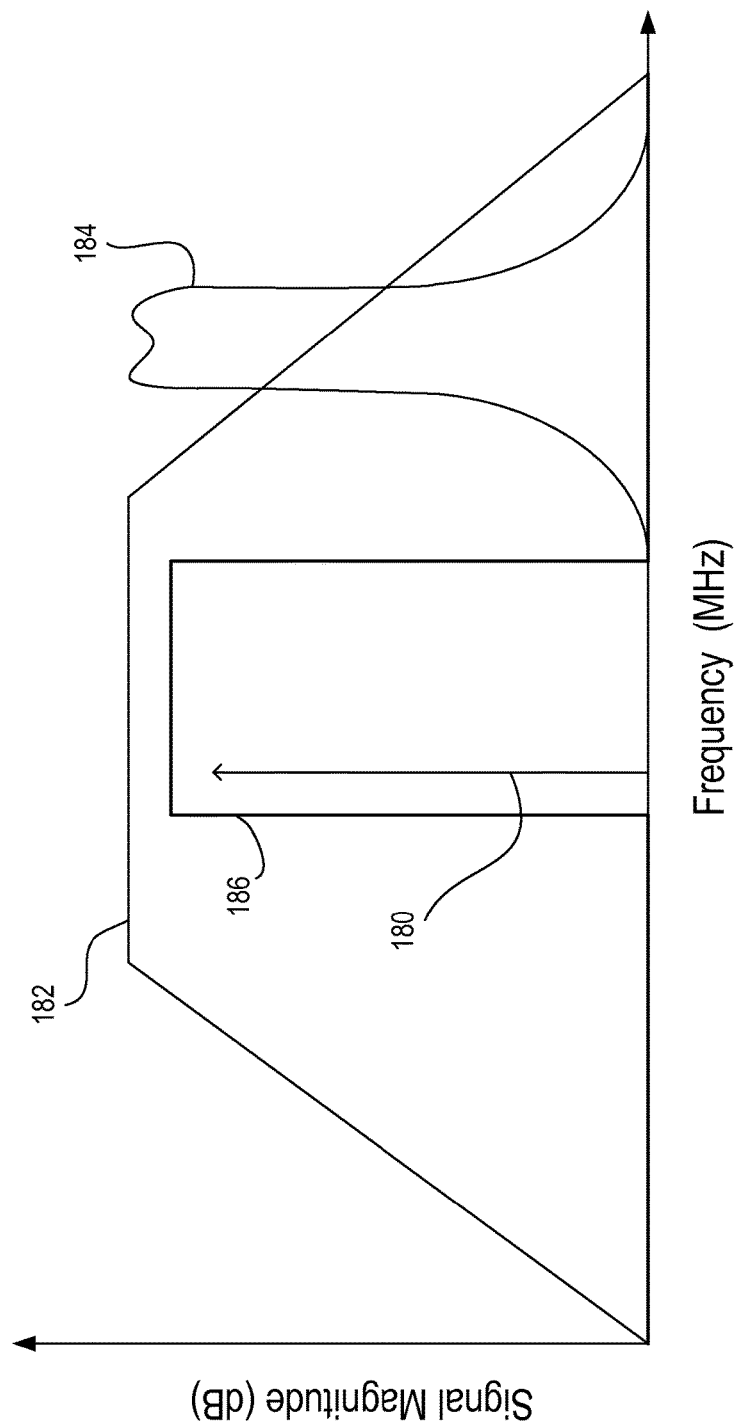
FIG. 7 is simplified frequency response of an RF filter of the motor drive unit of FIG. 5.

FIG. 7 shows an example of a simplified frequency response of the SAW filter 169. Frequency 180 illustrates an example frequency of the RF signals 106. A frequency response 182 illustrates the response of only the antenna 168 and the RF receiver 166 (i.e., the response without the SAW filter 169). As shown in FIG. 7, the frequency response 182 spans a wide range of frequencies (e.g., up to an 80 MHz band). As a result, the RF receiver 166 may be responsive to an interference event 184. In particular, the RF receiver 166 (without the presence of the SAW filter 169) will detect the presence of the interference event 184, and as a result, will cause the controller 152 to wake up via the RF wake up signal $V_{RF\_WAKE}$. As the controller 152 begins to process the interference event 184, the controller will appropriately disregard this interference event as it will recognize that it is not an RF signal 106. However as mentioned above, the controller 152 consumes additional power to process the interference event 184, and this negatively impacts the life of the batteries 138. FIG. 7 also illustrates a SAW frequency response 186 which spans a much narrower band of frequencies than frequency response 182. In particular, the SAW frequency response 186 does not encompass the interference event 184. As a result, the SAW filter 169 filters interference events (e.g., such as interference event 184), and this allows the controller 152 to not wake up unnecessarily, thus further conserving the life of the batteries 138.

Figure 8:
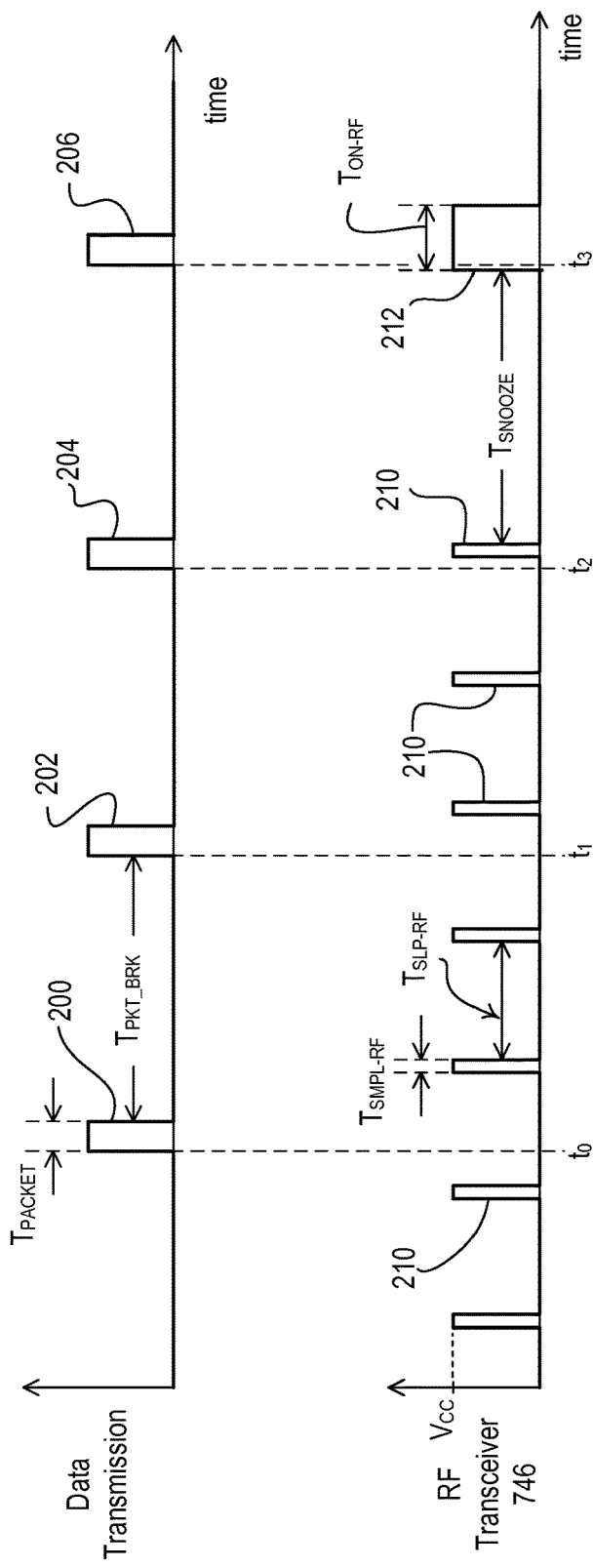
FIG. 8 is a simplified timing diagram of an RF data transmission event and a sampling event of the motor drive unit of FIG. 5.

FIG. 8 is a simplified timing diagram of a data transmission event transmitted by the RF remote control 190 to the motorized window treatment 110 and a sampling event of the RF receiver 166 of the motor drive unit 120. The remote control 190 transmits packets of data (e.g., the control information) via the RF signals 106 with each packet having a packet time period $T_{PACKET}$ (e.g, approximately 5 msec). Each packet of data is typically transmitted multiple times (e.g., up to twelve times) during a given data transmission event. Between each packet of data, there is a packet break time period $T_{PKT\_BRK}$ (e.g., approximately 75 ms), such that the remote control transmits digital messages at a transmission rate of approximately 12.5 packets per second. The RF receiver 166 of the motor drive unit 120 is operable to wake up and listen for any RF signals 106 during an RF sampling time period $T_{SMPL\_RF}$. If no RF signals 106 are detected during the RF sample time period $T_{SMPL\_RF}$, then the RF receiver 166 goes to sleep for an RF sleep time period $T_{SLP\_RF}$, such that the RF receiver samples the RF data at a sampling period $T_{SAMPLE}$. Alternatively, the break time period $T_{PKT\_BRK}$ could not be a fixed value, but could be a varying or random time between each of the transmitted packets.

The RF sample time period $T_{SMPL\_RF}$ and the RF sleep time period $T_{SLP\_RF}$ of the RF receiver 166 are sized appropriately to ensure that the RF sample time period $T_{SMPL\_RF}$ coincides with at least one packet of a predetermined number of consecutive packets of a data transmission event. As a result, the RF sleep time period $T_{SLP\_RF}$ of the RF receiver 166 can be much longer than the packet time period $T_{PACKET}$. In addition, the RF sample time period $T_{SMPL\_RF}$ can be significantly shorter than the packet time period $T_{PACKET}$. Accordingly, the RF receiver 166 is operable to sleep for longer periods of time than prior art RF receivers, thus extending the lifetime of the batteries 138 of the motor drive unit 120. For example, the RF sample time period $T_{SMPL\_RF}$ and the RF sleep time period $T_{SLP\_RF}$ may be sized to be approximately 0.1 msec and 17.8 msec, respectively, to ensure that the RF sample time period $T_{SMPL\_RF}$ coincides with at least one packet of five consecutive packets of a data transmission event.

Four packets 200, 202, 204, and 206 of a data transmission event are shown in FIG. 8. At time $t_0$, the remote control 190 begins to transmit the first packet 200 via the RF signals 106. The first packet 200 is not received by the RF receiver 166 because the packet is transmitted during the RF sleep time period $T_{SLP\_RF}$ (i.e., while the RF receiver is sleeping). In other words, the transmission of packet 200 does not coincide with an RF sampling event 210 of the RF receiver. Similarly, the second packet 202 transmitted at time $t_1$ is not received by the RF receiver 166 because the packet is transmitted during the RF sleep time and does not coincide with one of the RF sampling events 210 of the RF receiver 166.

At time $t_2$, the third packet 204 is transmitted and is detected by the RF receiver 166, such that the RF receiver wakes up the controller 152. Since the controller 152 wakes up in the middle of the transmission of the third packet 204 (i.e., has missed the beginning of the transmission of the third packet), the controller is unable to properly process the data contained within the third packet. However, the controller 152 is operable to process the third packet 204 sufficiently to determine that a fourth packet 206 will be transmitted after the packet break time period $T_{PKT\_BRK}$. Accordingly, the controller 152 and the RF receiver 166 are operable to enter the sleep mode for a snooze time period $T_{SNOOZE}$, which may be approximately equal to or slightly less than the packet break time period $T_{PKT\_BRK}$. As shown in FIG. 8, the snooze time period $T_{SNOOZE}$ expires just before time $t_3$, when the fourth packet 206 is transmitted. In other words, the duration of the snooze time period $T_{SNOOZE}$ is short enough to ensure that the RF receiver 166 is awake in time to receive the complete transmission of the fourth packet 206.

When the snooze time period $T_{SNOOZE}$ expires, the RF receiver 166 and the controller 152 wake up, and the RF transceiver begins to listen to RF signals 106 for at least the RF sample time period $T_{SMPL\_RF}$. Because the RF receiver 166 and the controller 152 are awake at time $t_3$ when the remote control 190 begins to transmit the fourth packet 206, the receiver is able to receive the entire packet. The receiver 166 remains on for an RF on time period $T_{ON\_RF}$ and is operable to receive the entire packet 206 during an RF receiving event 212, such that the controller 152 is able to properly process the packet 206 of data. Thus, because the RF receiver 166 and the controller 152 go back to sleep during the snooze time period $T_{SNOOZE}$ (and do not stay awake and fully powered while waiting for the next packet to be transmitted), the life of the batteries 138 is further conserved.

Figure 9:
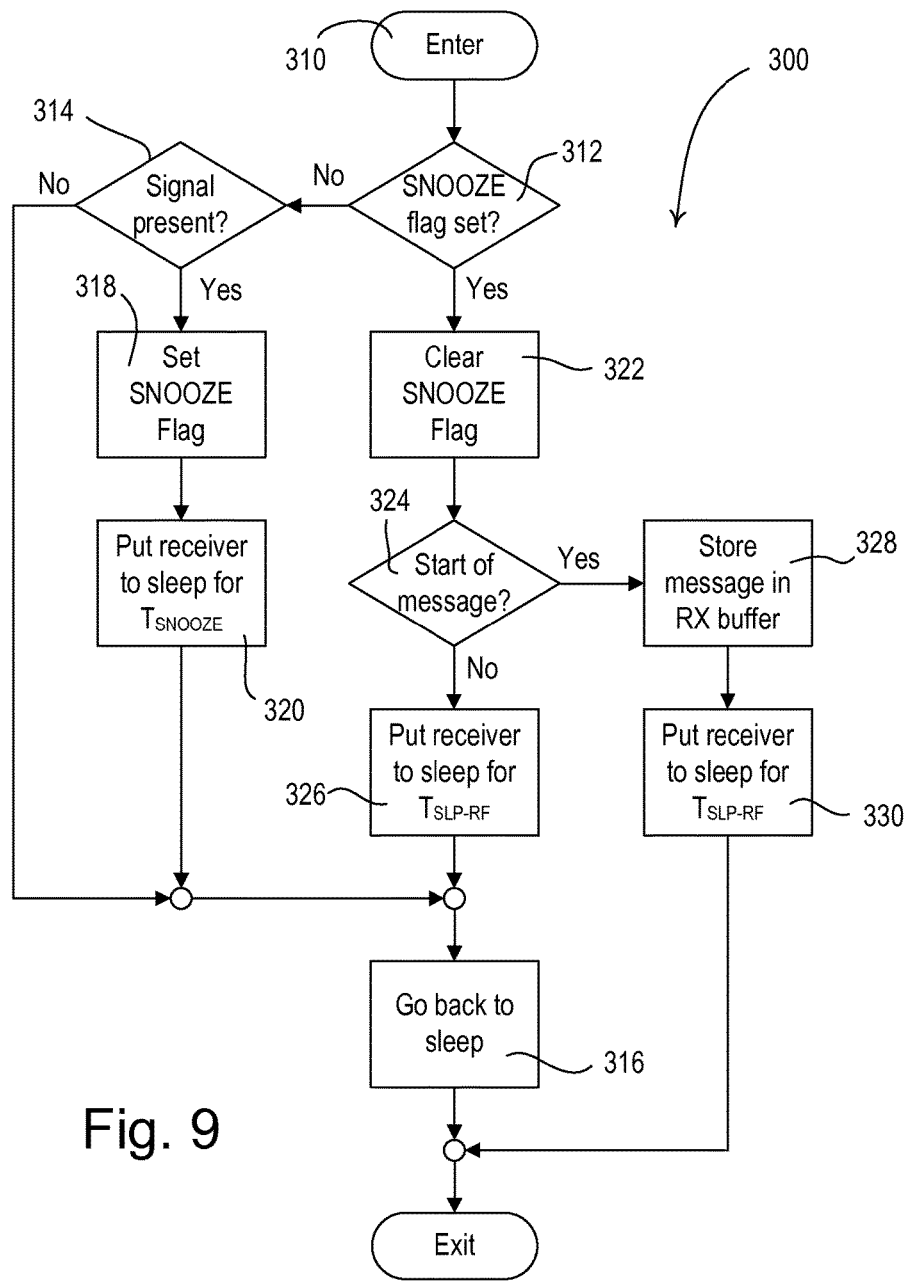
FIG. 9 is a simplified flowchart of an RF signal receiving procedure executed by a controller of the motor drive unit of FIG. 5.

FIG. 9 is a simplified flowchart of an RF signal receiving procedure 300 executed by the controller 152 after being awakened in response to the RF wake up signal $V_{RF\_WAKE}$ at step 310. The controller 152 uses a SNOOZE flag to keep track of when the RF receiver 166 has been put to sleep for the snooze time period $T_{SNOOZE}$. If the SNOOZE flag is not set at step 312 (i.e., the RF receiver 166 has not been put to sleep for the snooze time period $T_{SNOOZE}$) and the controller 152 does not detect an indication that an RF signal is present at step 314, the controller 152 simply goes back to sleep at step 316 and the RF signal receiving procedure 300 exits. However, if the controller 152 detects an RF signal at step 314, the controller sets the SNOOZE flag at step 318, and puts the RF receiver to sleep for the snooze time period $T_{SNOOZE}$ at step 320. The controller 152 then goes back to sleep at step 316, before the RF signal receiving procedure 300 exits.

If the SNOOZE flag is set at step 312 (i.e., the RF receiver 166 has been put to sleep for the snooze time period $T_{SNOOZE}$), the controller 152 first clears the SNOOZE flag at step 322 and then gets ready to receive a digital message. If the RF receiver 766 is not receiving the start of a digital message at step 324, the controller 152 puts the RF receiver to sleep for the RF sleep time period $T_{SLP\_RF}$ at step 326 and goes back to sleep at step 316, before the RF signal receiving procedure 300 exits. However, if the RF receiver 166 is receiving the start of a digital message at step 324, the controller 152 stores the received message in a receive (RX) buffer at step 328 and puts the RF receiver to sleep for the RF sleep time period $T_{SLP\_RF}$ at step 330. The RF signal receiving procedure 300 exits without the controller 152 being put back to sleep. The controller 152 will go back to sleep after processing the received digital message.

Figure 10:
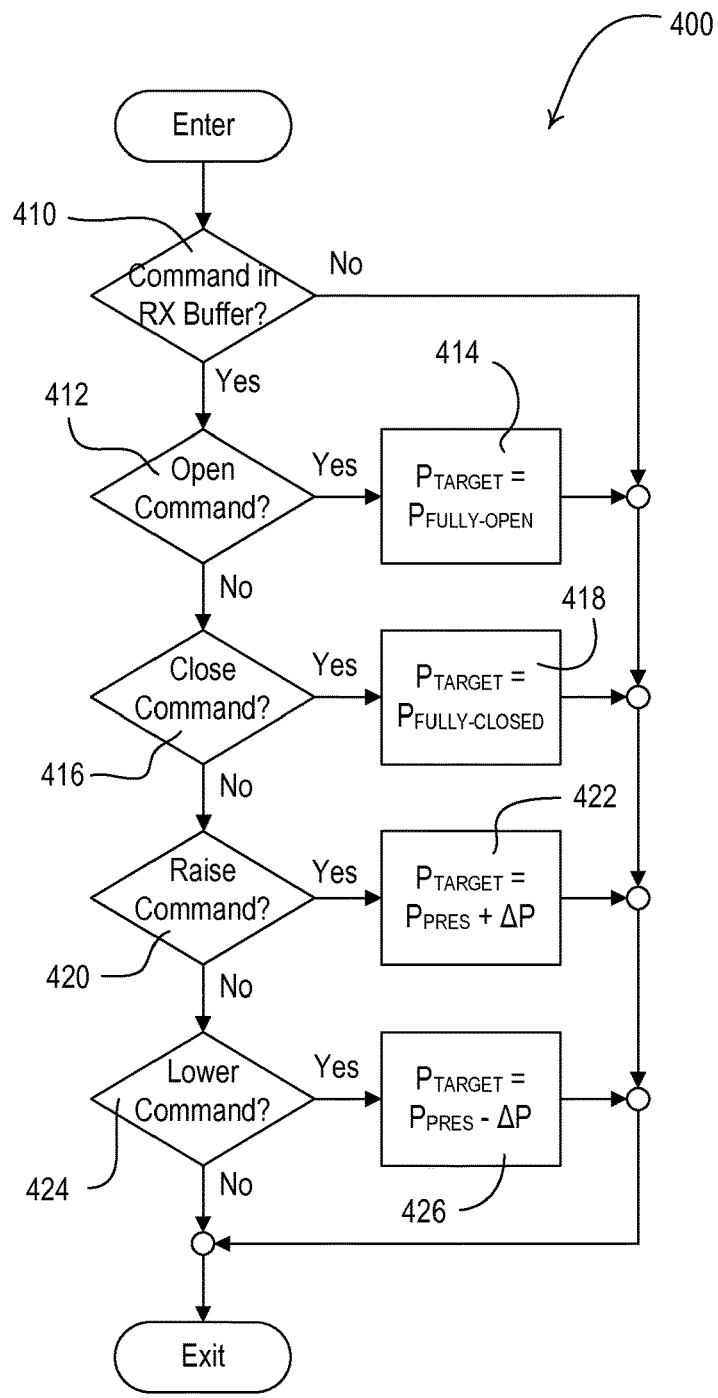
FIG. 10 is a simplified flowchart of a command procedure executed periodically by the controller of the motor drive unit of FIG. 5.

FIG. 10 is a simplified flowchart of a command procedure 400 executed periodically by the controller 152. If there is not a command in the RX buffer at step 410, the command procedure 400 simply exits. However, if there is an open command in the RX buffer at step 412, the controller 152 sets the target position $P_{TARGET}$ equal to the fully-open position $P_{FULLY-OPEN}$ at step 414, before the command procedure 400 exits. If the received command is a close command at step 416, the controller 152 sets the target position $P_{TARGET}$ equal to the fully-closed position $P_{FULLY-CLOSED}$ at step 418 and the command procedure 400 exits. If the received command is a raise command at step 420 or a lower command at step 424, the controller 152 respectively increases the target position $P_{TARGET}$ by a predetermined increment $\Delta P$ at step 422 or decreases the target position $P_{TARGET}$ by the predetermined increment $\Delta P$ at step 426, before the command procedure 400 exits.

Figure 11:
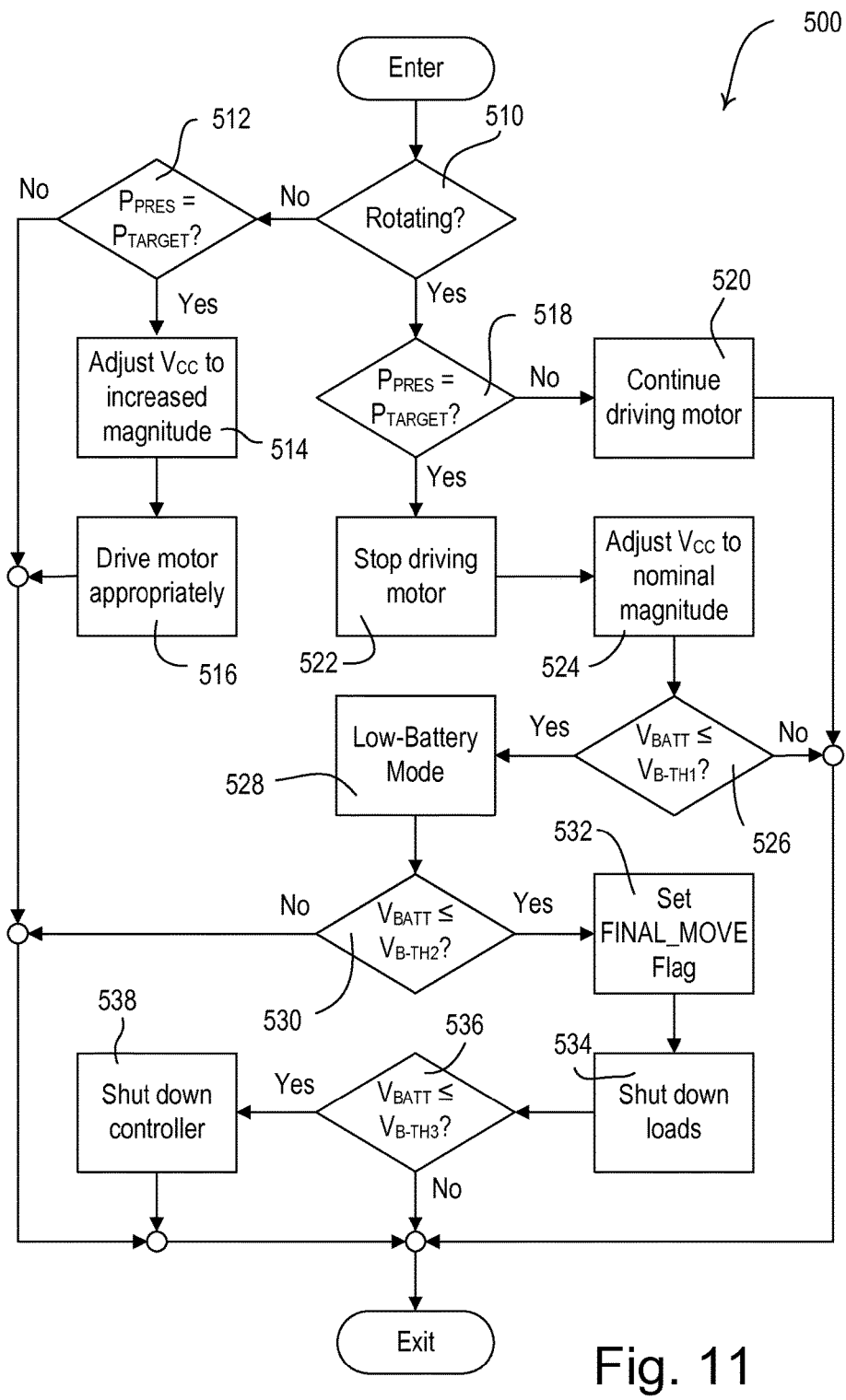
FIG. 11 is a simplified flowchart of a motor control procedure executed periodically by the controller of the motor drive unit of FIG. 5.

FIG. 11 is a simplified flowchart of a motor control procedure 500 executed periodically by the controller 152 (e.g., every two msec). If the motor 150 is not presently rotating at step 510 and the present position $P_{PRES}$ is equal to the target position $P_{TARGET}$ at step 512, the motor control procedure 500 simply exits without controlling the motor. However, if the motor 150 is not presently rotating at step 510 and the present position $P_{PRES}$ is not equal to the target position $P_{TARGET}$ at step 512, the controller 152 controls the voltage adjustment control signal $V_{ADJ}$ to adjust the magnitude of the DC supply voltage $V_{CC}$ to the increased magnitude (i.e., approximately 3.3 volts) at step 514. The controller 152 then begins to control the H-bridge drive circuit 154 to drive the motor 150 appropriately at step 516, so as to move the weighting element 116 towards the target position $P_{TARGET}$. If the motor 150 is presently rotating at step 510, but the present position $P_{PRES}$ is not yet equal to the target position $P_{TARGET}$ at step 518, the controller 512 continues to drive the motor 150 appropriately at step 520 and the motor control procedure 500 exits. If the motor 150 is presently rotating at step 510 and the present position $P_{PRES}$ is now equal to the target position $P_{TARGET}$ at step 518, the controller 152 stops driving the motor at step 522 and controls the voltage adjustment control signal $V_{ADJ}$ to adjust the magnitude of the DC supply voltage $V_{CC}$ to the nominal magnitude (i.e., approximately 2.7 volts) at step 524.

As previously mentioned, the controller 152 operates in a low-battery mode when the magnitude of the battery voltage $V_{BATT}$ is getting low. Specifically, if the magnitude of the battery voltage $V_{BATT}$ has dropped below the first battery-voltage threshold $V_{B-TH1}$ at step 526, the controller 152 begins at step 528 to operate in the low-battery mode during which the controller 152 will operate the motor at a reduced speed (i.e., at half speed). If the magnitude of the battery voltage $V_{BATT}$ is less than or equal to the second battery-voltage threshold $V_{B-TH2}$ at step 530, the controller 152 allows for one last movement of the cellular shade fabric 112 and the weighting element 116 to the fully-open position $P_{FULLY-OPEN}$ by setting a FINAL_MOVE flag in memory at step 532. At step 534, the controller 152 shuts down all unnecessary loads of the motor drive unit 120 (e.g., the external temperature sensor 162, the photosensor 164, the internal temperature sensor 160, and the IR receiver 166) and prevents the motor 150 from moving the cellular shade fabric 112 and the weighting element 116 except for one last movement to the fully-open position $P_{FULLY-OPEN}$. If the magnitude of the battery voltage $V_{BATT}$ is less than or equal to the third battery-voltage threshold $V_{B-TH3}$ at step 536, the controller 152 shuts itself down at step 538 such that no other circuits in the motor drive unit 120 consume any power to thus protect against any potential leakage of the batteries 138. Otherwise, the motor control procedure 500 exits.

The battery-powered motorized window treatment 110 is described in greater detail in U.S. patent application Ser. No. 13/415,084, filed Mar. 8, 2012, entitled MOTORIZED WINDOW TREATMENT, the entire disclosures of which are hereby incorporated by reference. While the battery-powered motorized window treatment 110 of the first embodiment comprises the cellular shade fabric 112, the low-power RF receiver 166 could alternatively be used in other types of motorized window treatments, such as, for example, roller shades, draperies, Roman shades, Venetian blinds, and tensioned roller shade systems. An example of a roller shade system is described in greater detail in commonly-assigned U.S. Pat. No. 6,983,783, issued Jan. 10, 2006, entitled MOTORIZED SHADE CONTROL SYSTEM, the entire disclosure of which is hereby incorporated by reference. An example of a drapery system is described in greater detail in commonly-assigned U.S. Pat. No. 6,994,145, issued Feb. 7, 2006, entitled MOTORIZED DRAPERY PULL SYSTEM, the entire disclosure of which is hereby incorporated by reference. An example of a Roman shade system is described in greater detail in commonly-assigned U.S. patent application Ser. No. 12/784,096, filed Mar. 20, 2010, entitled ROMAN SHADE SYSTEM, the entire disclosure of which is hereby incorporated by reference. An example of a Venetian blind system is described in greater detail in commonly-assigned U.S. patent application Ser. No. 13/233,828, filed Sep. 15, 2011, entitled MOTORIZED VENETIAN BLIND SYSTEM, the entire disclosure of which is hereby incorporated by reference. An example of a tensioned roller shade system is described in greater detail in commonly-assigned U.S. Pat. No. 8,056,601, issued Nov. 15, 2011, entitled SELF-CONTAINED TENSIONED ROLLER SHADE SYSTEM, the entire disclosure of which is hereby incorporated by reference.

Figure 12:
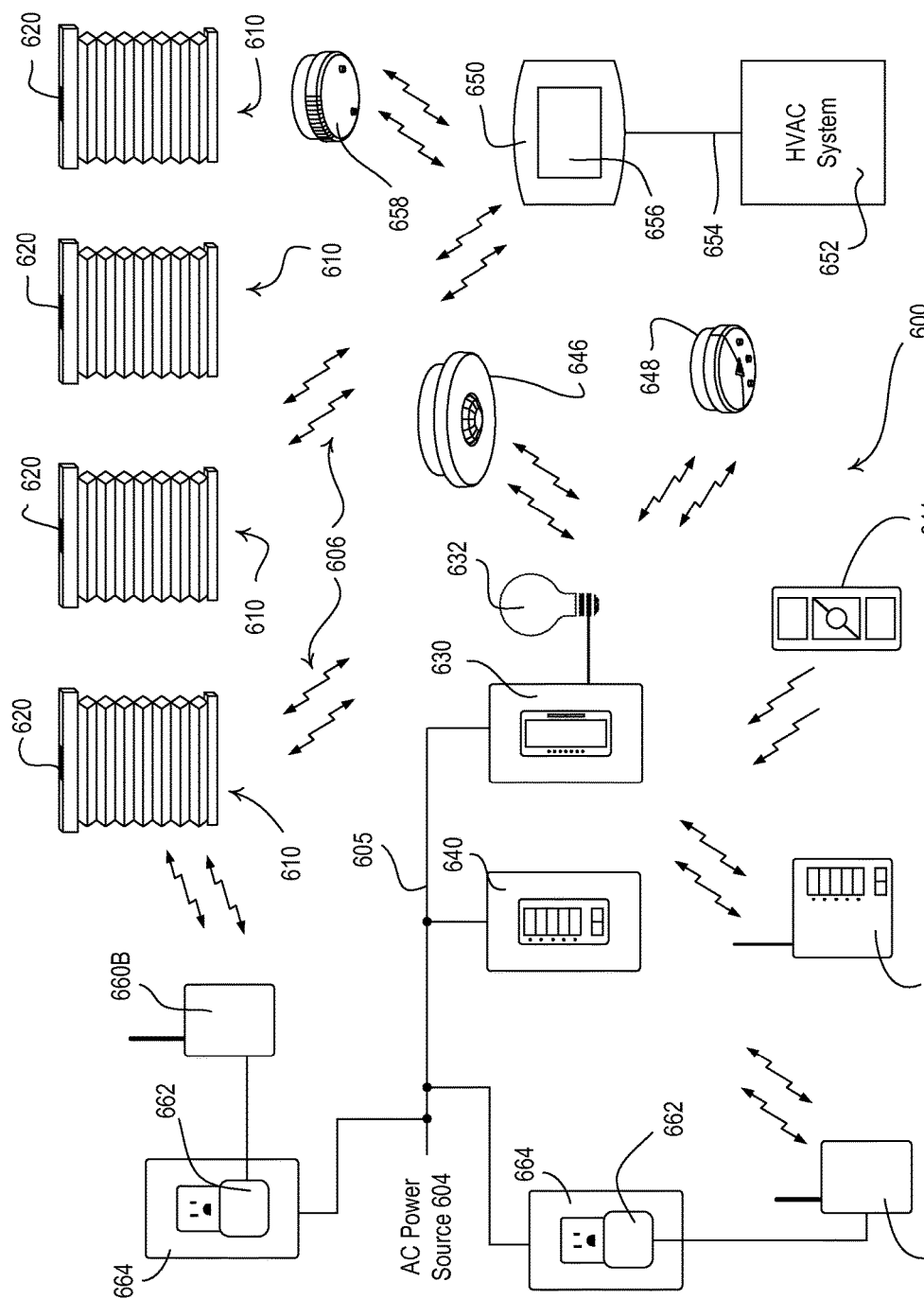
FIG. 12 is a simplified diagram of a radio-frequency load control system including multiple motorized window treatments according to a second embodiment of the present invention.

FIG. 12 is a simplified diagram of a radio frequency (RF) load control system 600 having multiple battery-powered motorized window treatments 610 according to a second embodiment of the present invention. The battery-powered motorized window treatments 610 of the second embodiment each have a very similar structure as the battery-powered motorized window treatment 110 of the first embodiment (as shown in FIG. 5). However, each of the motorized window treatments 610 of the second embodiment comprises a motor drive unit 620 having an RF transceiver (not shown) rather than the RF receiver 166, such that the motorized window treatments are operable to both transmit and receive RF signals 606. The control devices of the load control system 600 are operable to transmit packets using a packet time period $T_{PACKET}$ (e.g., approximately msec) and a packet break time period $T_{PKT\_BRK}$ (e.g., approximately 75 msec) as in the first embodiment.

As in the first embodiment, each motorized window treatment 610 is operable to enable the RF transceiver at a sampling period $T_{SAMPLE}$ (e.g., approximately 17.8 msec) to detect if an RF signal 602 is presently being transmitted. Each motorized window treatment 610 is operable put the RF transceiver to sleep for an RF sleep time period $T_{SLP-RF}$ that is much longer than the packet time period $T_{PACKET}$ (e.g., approximately 17.3 msec) and to enable an RF transceiver for the RF sample time period $T_{SMPL-RF}$ that is much shorter than the packet time period $T_{PACKET}$ (e.g., approximately 5 msec) so as to conserve battery power. The motorized window treatments 610 execute an RF signal receiving procedure similar to the RF signal receiving procedure 300 of the first embodiment as shown in FIG. 9. However, the motorized window treatments 610 of the second embodiment do not put the RF transceiver to sleep for the snooze time period $T_{SNOOZE}$ after detecting an RF signal during the RF sample time period $T_{SMPL-RF}$. Rather, the motorized window treatments 610 of the second embodiment simply remain on after detecting an RF signal during the RF sample time period $T_{SMPL-RF}$.

As shown in FIG. 12, the load control system 600 also comprises a lighting control device, e.g., a wall-mountable dimmer switch 630, which is coupled to an alternating-current (AC) power source 604 via a line voltage wiring 605. The dimmer switch 630 is operable to adjust the amount of power delivered to a lighting load 632 to control the lighting intensity of the lighting load. The dimmer switch 630 is operable to transmit and receive digital messages via the RF signals 606 and is operable to adjust the lighting intensity of the lighting load 632 in response to the digital messages received via the RF signals.

Figure 13:
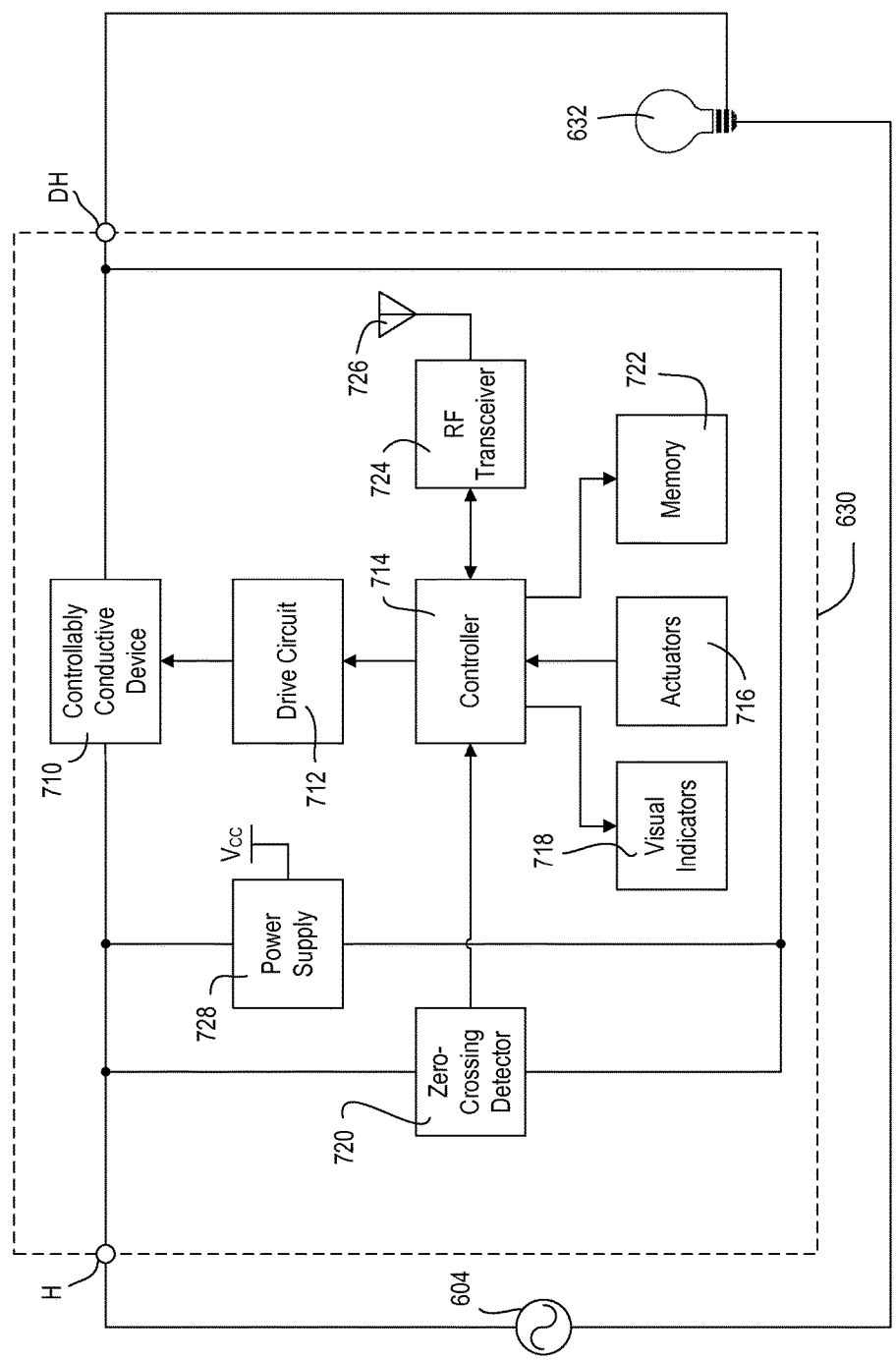
FIG. 13 is a simplified block diagram of a dimmer switch of the load control system of FIG. 12 according to the second embodiment of the present invention.

FIG. 13 is a simplified block diagram of the dimmer switch 630 according to the second embodiment of the present invention. The dimmer switch 630 comprises a hot terminal H that is adapted to be coupled to the AC power source 604 and a dimmed hot terminal DH adapted to be coupled to the lighting load 632. The dimmer switch 630 comprises a controllably conductive device 710 coupled in series electrical connection between the AC power source 1002 and the lighting load 632 for control of the power delivered to the lighting load. The controllably conductive device 710 may comprise any suitable type of bidirectional semiconductor switch, such as, for example, a triac, a field-effect transistor (FET) in a rectifier bridge, or two FETs in anti-series connection. The dimmer switch 630 comprises a controller 714 that is operatively coupled to a control input of the controllably conductive device 710 via a gate drive circuit 712 for rendering the controllably conductive device conductive or non-conductive to thus control the amount of power delivered to the lighting load 632. The controller 714 is, for example, a microprocessor, but may alternatively be any suitable processing device, such as a programmable logic device (PLD), a microcontroller, or an application specific integrated circuit (ASIC).

The controller 714 receives inputs from actuators 716 for controlling the present intensity of the lighting load 632, and controls one or more visual indicators 718 for providing feedback of the present intensity of the lighting load. The controller 714 receives a control signal representative of the zero-crossing points of the AC mains line voltage of the AC power source 604 from a zero-crossing detector 720. The controller 714 is operable to render the controllably conductive device 710 conductive and non-conductive at pre-determined times relative to the zero-crossing points of the AC waveform using a phase-control dimming technique. The dimmer switch 630 further comprises a memory 722 for storing the present intensity of the lighting load 632 as well as other operating characteristics of the dimmer switch. The memory 722 may be implemented as an external integrated circuit (IC) or as an internal circuit of the controller 714.

The dimmer switch 630 also comprises a radio-frequency (RF) transceiver 724 and an antenna 726 for transmitting and receiving digital messages via RF signals. The controller 714 is operable to control the controllably conductive device 710 to adjust the intensity of the lighting load 632 in response to the digital messages received via the RF signals. The controller 714 may also transmit feedback information regarding the amount of power being delivered to the lighting load 632 via the digital messages included in the RF signals. The RF transceiver 724 could alternatively be implemented as an RF receiver for only receiving RF signals. To check for RF signals that are being transmitted, the controller 714 enables the RF transceiver 724 at a sampling period $T_{SAMPLE}$ (e.g., approximately 17.8 msec) using, for example, a duty cycle of approximately 50%, such that the dimmer switch 630 enables the RF transceiver for an RF sample time period $T_{SMPL-RF}$ (e.g., approximately 8.9 msec), and puts the RF transceiver to sleep for an RF sleep time period $T_{SLP-RF}$ (e.g., approximately 8.9 msec). Accordingly, the RF sleep time period $T_{SLP-RF}$ used by the dimmer switch 630 is longer than the packet time period $T_{PACKET}$ so as to reduce the total power consumed by the dimmer switch 630.

The dimmer switch 630 comprises a power supply 728 for generating a direct-current (DC) supply voltage $V_{CC}$ for powering the controller 714, the memory 722, the RF transceiver 724, and the other low-voltage circuitry of the dimmer switch. Since the dimmer switch 630 does not have a connection to the neutral side of the AC power source 604, the power supply 724 is operable to conduct a charging current through the lighting load 632 to generate the DC supply voltage $V_{CC}$. Some lighting loads may be susceptible to flickering and other undesirable behavior if the magnitude of the charging current conducted through the lighting load is too large. Accordingly, the use of the RF sleep time period $T_{SLP-RF}$ that is longer than the packet time period $T_{PACKET}$ by the controller 714 helps to reduce the magnitude of the charging current conducted through the lighting load 632 and thus helps to avoid flickering in the lighting load.

Figure 14:
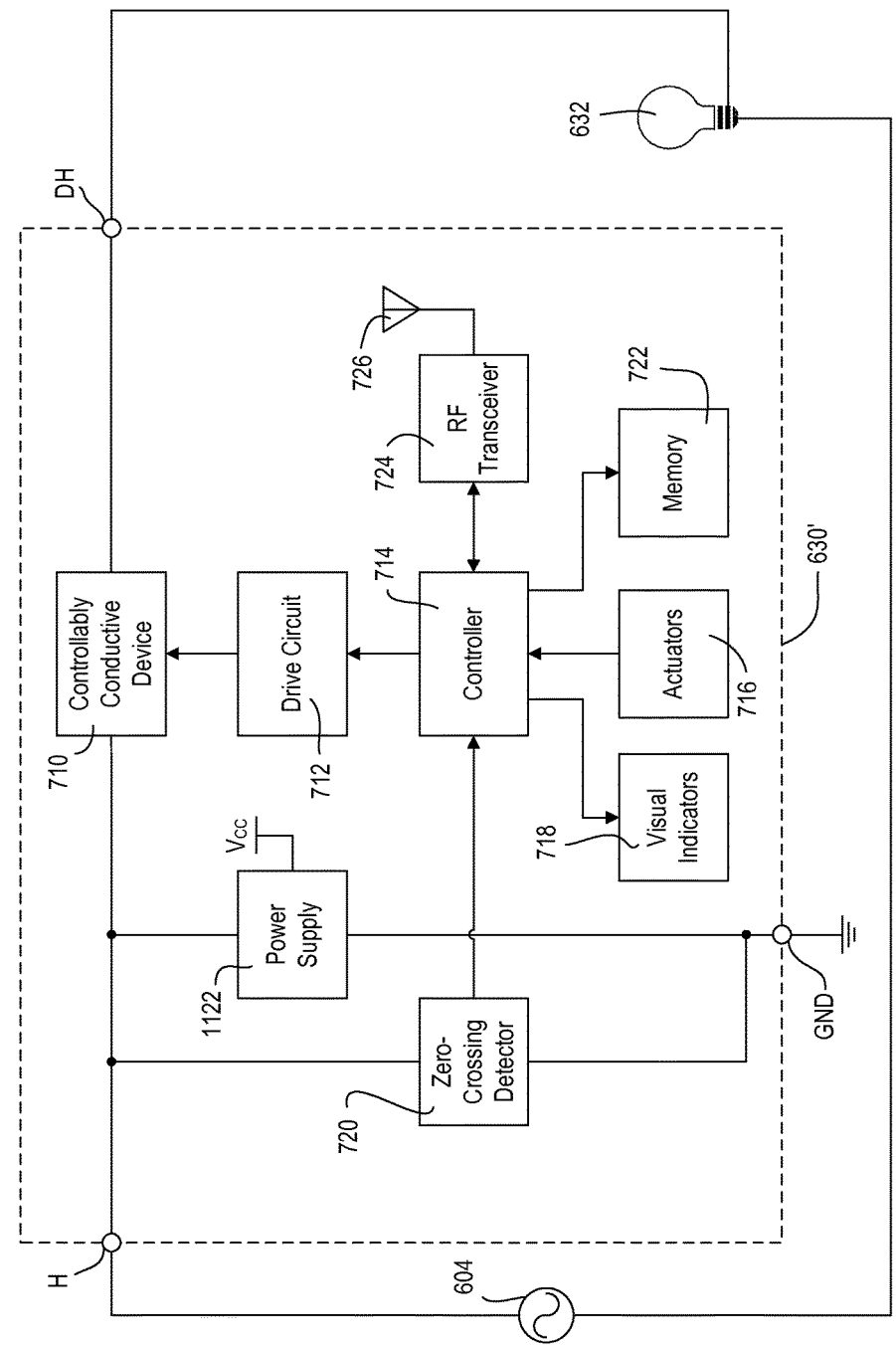
FIG. 14 is a simplified block diagram of a dimmer switch of the load control system of FIG. 12 according to an alternate embodiment of the present invention.

FIG. 14 is a simplified block diagram of a dimmer switch 630' according to an alternate embodiment of the present invention. The dimmer switch 630' is very similar to the dimmer switch 630 of the second embodiment. However, the dimmer switch 630' has an earth ground terminal GND that is adapted to be coupled to earth ground. The zero-crossing detector 620 and the power supply 628 of the dimmer switch 630' are coupled between the hot terminal H and the earth ground terminal GND (rather than the dimmed hot terminal DH). Accordingly, the power supply 728 conducts the charging current through the earth ground terminal GND (rather than the lighting load 632). The magnitude of the total current conducted through the earth ground terminal GND by the dimmer switch 630' is limited by standards and regulations in most countries. The use of the RF sleep time period $T_{SLP-RF}$ that is longer than the packet time period $T_{PACKET}$ by the controller 714 helps to reduce the magnitude of the charging current conducted through the earth ground terminal GND.

Referring back to FIG. 12, the load control system 600 further comprises a wall-mounted button keypad 640 and a battery-powered tabletop button keypad 642. The wall-mounted button keypad 640 is powered from the AC power source 604 via the line voltage wiring 605, and the tabletop button keypad 642 is a battery-powered device. Both of the keypads 640, 642 transmit digital messages to the dimmer switch 630 via the RF signals 606 in order to provide for remote control of the lighting load 632. In addition, each of the keypads 640, 642 is operable to receive digital status messages via the RF signals 606 from the dimmer switch 630 in order to display the status (i.e., on/off state and/or intensity level) of the lighting load 632. The load control system 600 further comprises a battery-powered remote control 644 which is operable to transmit digital messages to the dimmer switch 630 via the RF signals 606 in order to provide for remote control of the lighting load 632. The wall-mounted button keypad 640, the tabletop button keypad 642, and the remote control 644 are also operable to adjust the present position $P_{PRES}$ of the battery-powered motorized window treatments 610 by transmitting digital messages via the RF signals 606. In addition, the battery-powered motorized window treatments 610 may be operable to transmit status information to the wall-mounted keypad 640 and tabletop button keypad 642.

The load control system 600 further comprises a battery-powered wireless occupancy sensor 646 for detecting an occupancy condition (i.e., the presence of an occupant) or a vacancy condition (i.e., the absence of an occupant) in the space in which the occupancy sensor is mounted. The occupancy sensor 646 is operable to wirelessly transmit digital messages via the RF signals 606 to the dimmer switch 630 in response to detecting the occupancy condition or the vacancy condition in the space. For example, in response to detecting an occupancy condition in the space, the occupancy sensor 646 may transmit a digital message to the dimmer switch 630 to cause the dimmer switch to turn on the lighting load 632, and in response to detecting a vacancy condition in the space, transmit a digital message to the dimmer switch to cause the dimmer switch to turn off the lighting load. Alternatively, the occupancy sensor 646 could be implemented as a vacancy sensor, such that the dimmer switch 630 would only operate to turn off the lighting load 632 in response to receiving the vacant commands from the vacancy sensor. Examples of RF load control systems having occupancy and vacancy sensors are described in greater detail in commonly-assigned U.S. Pat. No. 7,940,167, issued May 10, 2011, entitled BATTERY-POWERED OCCUPANCY SENSOR; U.S. Pat. No. 8,009,042, issued Aug. 30, 2011, entitled RADIO-FREQUENCY LIGHTING CONTROL SYSTEM WITH OCCUPANCY SENSING; and U.S. patent application Ser. No. 12/371,027, filed Feb. 13, 2009, entitled METHOD AND APPARATUS FOR CONFIGURING A WIRELESS SENSOR; the entire disclosures of which are hereby incorporated by reference.

The load control system 600 further comprises a battery-powered daylight sensor 648 for measuring an ambient light intensity in the space in which the daylight sensor in mounted. The daylight sensor 648 wirelessly transmits digital messages via the RF signals 606 to the dimmer switch 630. For example, the daylight sensor 648 may transmit a digital message to the dimmer switch 630 to cause the dimmer switches to increase the intensities of the lighting load 632 if the ambient light intensity detected by the daylight sensor 648 is less than a setpoint light intensity, and to decrease the intensities of the lighting load if the ambient light intensity is greater than the setpoint light intensity. The packet break time period $T_{PKT\_BRK}$ of the packets transmitted by the daylight sensor 648 may be variable, for example, as a function of the measured light intensity. The battery-powered motorized window treatments 610 may be operable to receive digital messages from the occupancy sensor 646 and the daylight sensor 648 via the RF signals 606 and to adjust the present position of the window treatments. Examples of RF load control systems having daylight sensors are described in greater detail in commonly-assigned U.S. patent application Ser. No. 12/727,956, filed Mar. 19, 2010, entitled WIRELESS BATTERY-POWERED DAYLIGHT SENSOR, and U.S. patent application Ser. No. 12/727,923, filed Mar. 19, 2010, entitled METHOD OF CALIBRATING A DAYLIGHT SENSOR, the entire disclosures of which are hereby incorporated by reference.

The load control system 600 further comprises a battery-powered temperature control device 650 (e.g., a thermostat) that is operable to control a heating and/or cooling system, e.g., a heating, ventilation, and air conditioning (HVAC) system 652. The temperature control device 650 may be coupled to the HVAC system 652 via an HVAC communication link 654, e.g., a digital communication link (such as an RS-485 link, an Ethernet link, or a BACnet® link), or alternatively via a wireless communication link (such as an RF communication link). The temperature control device 650 may comprise an internal temperature sensor for determining a present temperature in the space in which the temperature control device is located. The temperature control device 650 transmits appropriate digital messages to the HVAC system 652 to control the present temperature in the building towards a setpoint temperature. Alternatively, the HVAC communication link 654 could comprise a more traditional analog control link for simply turning the HVAC system 652 on and off. The temperature control device 650 comprises a user interface, e.g., a touch screen 656, for displaying the present temperature and the setpoint temperature, and for receiving user inputs for adjusting the setpoint temperature. The temperature control device 650 is operable to receive RF signals 606 from a wireless temperature sensor 656 for determining the present temperature in the space, for example, at a location away from the temperature control device 650. In addition, the motor drive units 620 of each of the motorized window treatments 610 may be operable to transmit the temperature measurements from the internal and/or external temperature sensors 160, 162 to the temperature control device 650.

Each of the battery-powered devices of the load control system 600 (i.e., the tabletop button keypad 642, the remote control 644, the occupancy sensor 646, the daylight sensor 648, and the temperature control device 650) is operable to enable their respective RF transceivers at a sampling period $T_{SAMPLE}$ (e.g., approximately 17.8 msec) to detect if an RF signal 602 is presently being transmitted as described above for the motorized window treatments 610. Each of these battery-powered devices is operable put its RF transceiver to sleep for an RF sleep time period $T_{SLP-RF}$ that is much longer than the packet time period $T_{PACKET}$ (e.g., approximately 5 msec) and to enable the RF transceiver for the RF sample time period $T_{SMPL-RF}$ that is much shorter than the packet time period $T_{PACKET}$ (e.g., approximately 17.3 msec) so as to conserve battery power.

In addition, the load control system 600 could also comprise other types of input devices and load control devices that each may put its RF transceiver to sleep for an RF sleep time period $T_{SLP-RF}$ that is much longer than the packet time period $T_{PACKET}$. For example, the additional types of input devices may comprise battery-powered remote controls, a temperature sensors, humidity sensors, security sensors, proximity sensors, keypads, key fobs, cell phones, smart phones, tablets, personal digital assistants, personal computers, timeclocks, audio-visual controls, safety devices, and central control transmitters. The additional types of load control devices may comprise, for example, an electronic dimming ballast for a fluorescent lamp; a driver for a light-emitting diode (LED) light source; a screw-in luminaire that includes a light source and an integral load regulation circuit; a switching device for turning one or more appliances on and off; a plug-in load control device for controlling one or more plug-in loads; a motor control device for controlling a motor load, such as a ceiling fan or an exhaust fan.

The load control system 600 further comprises signal repeaters 660A, 660B, which are operable to retransmit any received digital messages to ensure that all of the control devices of the load control system receive all of the RF signals 606. The load control system 600 may comprise, for example, one to five signal repeaters depending upon the physical size of the system. Each of the control devices, (e.g., the motorized window treatments 610, the dimmer switch 630, the tabletop button keypad 642, the wall-mounted button keypad 640, the occupancy sensor 646, the daylight sensor 648, and the temperature control device 650) of the load control system 600 are located within the communication range of at least one of the signal repeaters 660A, 660B. The signal repeaters 660A, 660B are powered by the AC power source 604 via power supplies 662 plugged into electrical outlets 664.

According to the second embodiment of the present invention, one of the signal repeaters (e.g., signal repeater 660A) operates as a "main" repeater (i.e., a main controller) to facilitate the operation of the load control system 600. The main repeater 660A has a database, which defines the operation of the load control system, stored in memory. For example, the main repeater 660A is operable to determine which of the lighting load 632 is energized and to use the database to control any visual indicators of the dimmer switch 630 and the keypads 642, 640 accordingly to provide the appropriate feedback to the user of the load control system 600. In addition, the control devices of the load control system may be operable to transmit status information to the signal repeaters 660A, 660B. For example, the motor drive unit 620 of each of the motorized window treatments 610 may be operable to transmit a digital message representative of the magnitude of the respective battery voltage to the signal repeaters 660A, 660B, a digital message including a low-battery indication to the signal repeaters when operating in the low-battery mode, or a digital message representative of the present position $P_{PRE-SET}$ of the motorized window treatment.

As mentioned above, the load control system 600 may comprise one to five signal repeaters depending upon the physical size of the system. The control devices of the load control system 600 are each operable to adjust the RF sampling period $T_{SAMPLE}$ in response to the total number $N_{RPTR}$ of signal repeaters within the load control system 600. Specifically, each control device is operable to adjust the RF sleep time period $T_{SLP-RF}$, while keeping the RF sampling time period $T_{SMPL-RF}$ constant. The control devices adjust the respective sampling periods because packets of data may be transmitted differently via the RF signals 606 depending on the number of repeaters in the load control system 600. In particular, the packet break time period $T_{PKT\_BRK}$ of the data transmissions may vary in response to the number of repeaters to ensure that the signal repeaters in the load control system 600 have sufficient time to propagate a given packet. Because the packet break time period $T_{PKT\_BRK}$ is a factor in appropriately sizing the RF sleep time period $T_{RF\_SLEEP}$ of each of the control devices to ensure that an RF sampling event coincides with a packet transmission as discussed above with respect to FIG. 8, the RF sleep time period $T_{RF\_SLEEP}$ also varies accordingly if the packet break time period $T_{PKT\_BRK}$ of a transmitted packet varies.

Figure 15:
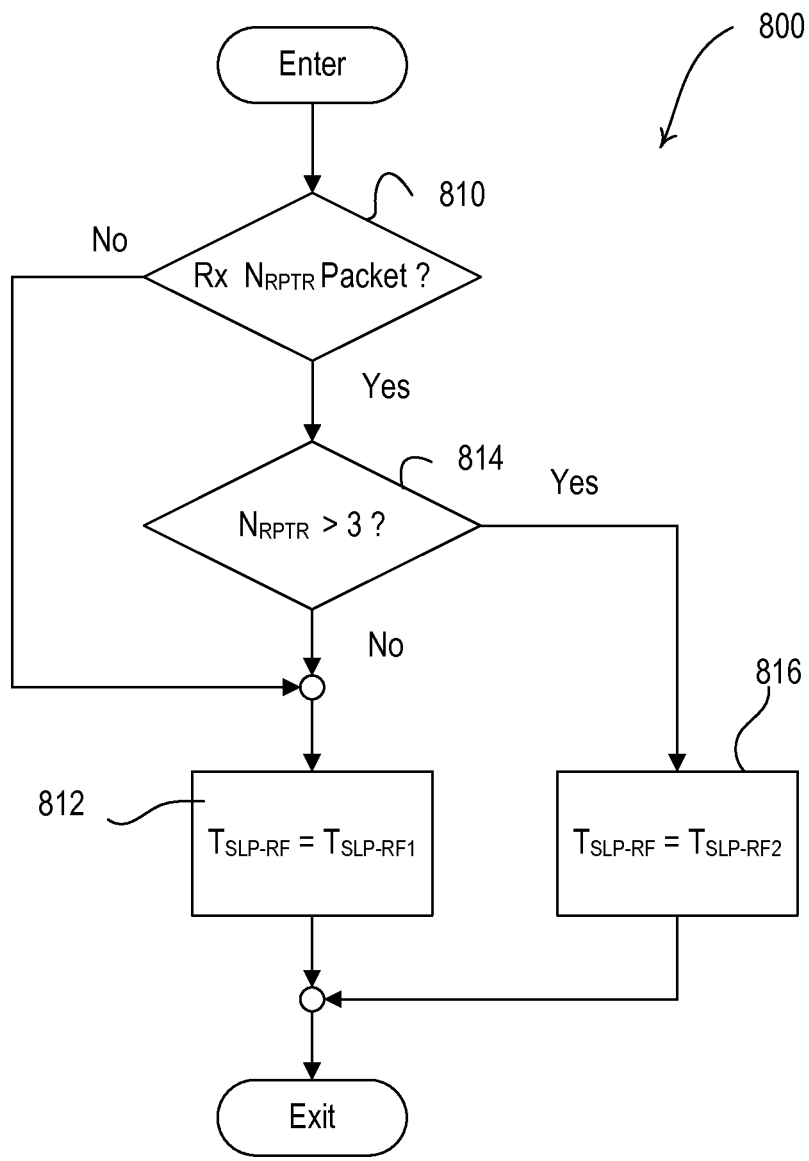
FIG. 15 is a simplified flowchart of an RF sampling rate selection procedure executed by a controller of one of the battery-powered motorized window treatments of FIG. 12.

FIG. 15 is a simplified flowchart of an RF sampling rate selection procedure 800 that may be executed by any of control devices of the load control system 600, e.g., the motor drive unit 620. Typically, this sampling rate procedure 800 may be executed during a configuration of the motor drive unit 612. In the event that there is at least one signal repeater (e.g., signal repeater 660A) in the load control system 600, that signal repeater will send a message to the motor drive unit 620 to inform the motor drive unit of the total number of repeaters $N_{RPTR}$ in the load control system. At step 810, the motor drive unit 620 determines whether it has received a packet containing the number of repeaters $N_{RPTR}$. In the event that the motor drive unit 620 has not received such a packet, then the motor drive unit assumes that it is operating in a load control system that contains no signal repeaters. As a result, the motor drive unit 620 uses a first RF sleep time period value $T_{SLP-RF1}$ (e.g., approximately 17.8 msec) as the RF sleep time period $T_{SLP-RF}$ at step 812 before the RF sampling rate selection procedure 1100 exits.

If the motor drive unit 620 has received a packet containing the number of repeaters $N_{RPTR}$, the motor drive unit determines whether the number of repeaters $N_{RPTR}$ is greater than three at step 814. If the number of repeaters $N_{RPTR}$ is not greater than three at step 814, the motor drive unit 620 uses the first RF sleep time period value $T_{SLP-RF1}$ (e.g., approximately 17.8 msec) as the RF sleep time period $T_{SLP-RF}$ at step 816 before the sampling rate selection procedure 800 exits. If the number of repeaters $N_{RPTR}$ is greater than three at step 814, the motor drive unit 620 uses a second RF sleep time period value $T_{SLP-RF2}$ (e.g., approximately 16.3 msec) as the RF sleep time period $T_{SLP-RF}$ at step 818 before the RF sampling rate selection procedure 800 exits. The RF sampling rate selection procedure 800 ensures that the motor drive unit 620 adjusts its RF sampling rate $T_{SAMPLE}$ in response to the number of repeaters in the load control system 600 to optimize reliability, response time, and battery life. The other battery-powered devices of the load control system 600 (i.e., the tabletop button keypad 642, the remote control 644, the occupancy sensor 646, the daylight sensor 648, and the temperature control device 650) may also execute the RF sampling rate selection procedure 800.

Figure 16:
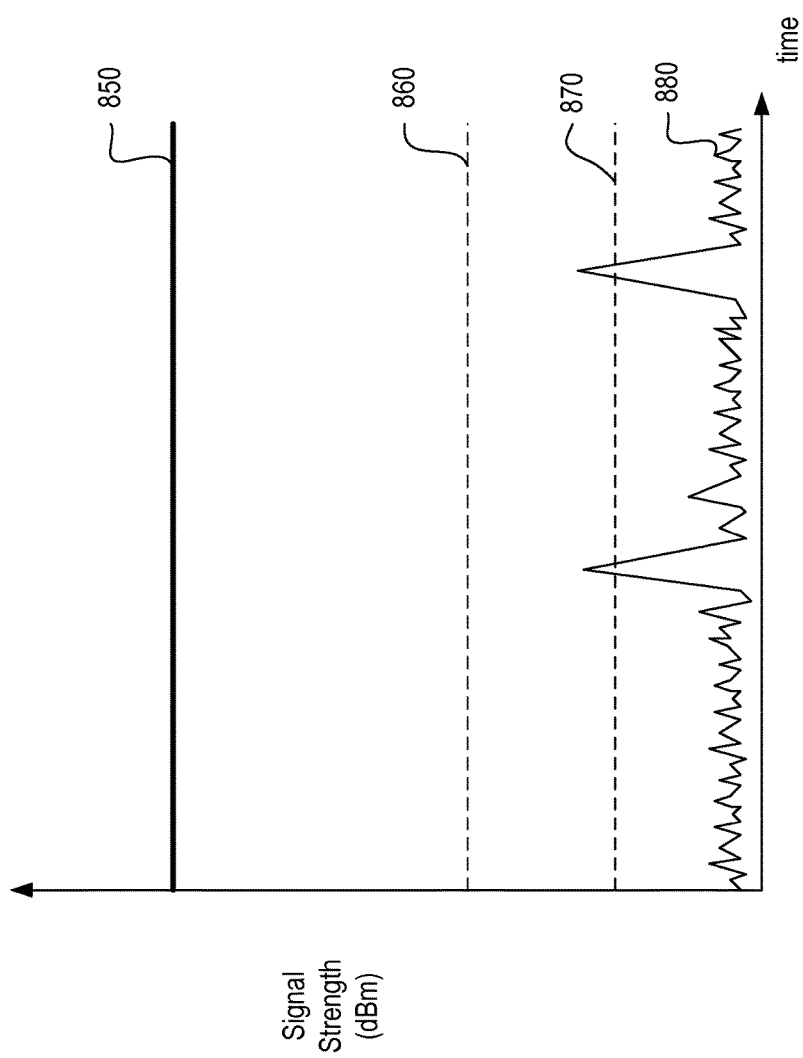
FIG. 16 is a simplified graph illustrating various signal strength thresholds of one of the battery-powered motorized window treatments of FIG. 12.

The RF transceivers of the control devices of the load control system 600 are characterized by a signal strength threshold which is used to detect the transmitted RF signals 606. Particularly, the RF transceiver of each of the control devices of the load control system 600 is characterized by an adjustable signal strength threshold. FIG. 16 is a simplified graph illustrating various signal strength thresholds of, for example, the RF transceiver of one of the motor drive units 620. In particular, FIG. 16 illustrates two signal strength thresholds of the RF transceiver: a first threshold 860 (i.e., an extended battery threshold) and a second threshold 870 (i.e., an extended range threshold) having a lower magnitude than the first threshold. The first and second thresholds 860, 870 reside between a noise floor 880 and a signal strength 850 of the nearest signal repeater (e.g., one of the signal repeaters 660A, 660B). While FIG. 16 is described with reference to the motorized window treatments 620, the other battery-powered devices of the load control system 600 (i.e., the tabletop button keypad 642, the remote control 644, the occupancy sensor 646, the daylight sensor 648, and the temperature control device 650) may also have RF transceivers having adjustable signal strength thresholds.

During a configuration or set-up procedure of each of the motor drive units 620, a user may be operable to select the signal strength of the RF transceiver as having either the first threshold 860 or the second threshold 870. When using the second threshold 870 to detect RF signals 606, the RF transceiver is operable to detect RF signals of a lower signal strength which can improve the range performance of the RF transceiver (i.e., the RF transceiver can detect RF signals sent from control devices that are located farther away). However, the second threshold 870 may cause the RF transceiver to be more sensitive to noise events as the noise floor 880 may occasionally exceed the second threshold. Each time the RF transceiver receives any RF energy (RF signals 606, RF noise, etc.) that exceeds the second threshold 870 during the RF sampling time period $T_{SMPL-RF}$, the RF transceiver wakes up the controller of the motor drive unit 620, such that the controller then consumes additional power which ultimately reduces the life of the batteries of the motor drive unit. When the RF transceiver uses the first threshold 860 to detect RF signals 606, the RF transceiver is less likely to detect RF signals having a lower signal strength, but is less susceptible to noise events. Because the RF transceiver only responds to RF energy (RF signals 606, RF noise, etc.) that exceeds the first threshold 860, the RF transceiver does not wake up the controller as frequently as when the second threshold 870 is used. As a result, the life of the batteries can be further extended when the RF transceiver uses the first threshold 660.

The first and second thresholds 860, 870 may be predetermined values. For example, the first threshold 860 may have a value of approximately −90 dBm and the second threshold 670 may have a value of approximately −97 dBm. Alternatively, the value of the adjustable threshold of the RF transceiver could be determined automatically during the configuration procedure of the motor drive unit 620. For example, the RF transceiver may be operable to detect an average magnitude of the noise floor 880 and may also be able to detect a magnitude of the signal strength 850 of the nearest signal repeater 660A, 660B, and then provide these magnitudes to the controller of the motor drive unit. The controller may then calculate an optimal value of a threshold for the RF transceiver that will preserve battery life and provide appropriate range performance. For example, the controller may halve the sum of the magnitude of the noise floor 880 and the magnitude of the signal strength 850 of the nearest signal repeater to calculate the value of the threshold for the RF transceiver. In addition, in the event that the calculated threshold value of the RF transceiver is too close (e.g., within ~5 dBm) to the noise floor 880, the load control system 600 may be operable to prompt a user, e.g., through a programming interface (not shown), to add another signal repeater to the system. By adding another signal repeater to the system, the magnitude of the signal strength of the nearest signal repeater may increase, thus increasing the calculated threshold of the RF transceiver. As a result, the battery life of each of the motor drive units 620 may be further extended.

During the configuration process of the load control system 600, the motor drive units 620 are each assigned to a particular frequency channel such that each motor drive can receive RF signals 606 transmitted on that frequency channel. During normal operation, the motor drive units 620 will each detect any packet of information that is transmitted on the respective assigned frequency channel—even if that packet does not contain data that is addressed to the motor drive unit. As soon as the RF transceiver of each motor drive unit 620 begins to detect a packet transmitted on the assigned frequency channel, the RF transceiver will wake up the controller of the motor drive unit as previously described. The controller will then process the packet to determine whether it must adjust the present position $P_{PRES}$ of the motorized window treatment 610. In the event that the packet is not addressed to the motor drive unit 620 (e.g., the packet contains information only for a dimmer switch 630), the controller will take no further action and will go back to sleep. However, because the controller woke up to process the packet, the controller consumed power unnecessarily, and negatively impacted the life of the batteries of the motor drive unit 620.

Because the load control system 600 comprises many devices that are operable to send and/or receive RF signals 606, there can be a very large number of packets regularly transmitted within the system. Many of these packets may not be addressed to the motor drive units 620, and as a result, need not be processed by the controller of each of the motor drive units. According to an aspect of the present invention, the battery-power motorized window treatments 610 may be configured to only listen to RF signals 606 transmitted on an alternate channel distinct from the channels used by the other devices of the load control system 600.

Figure 17:
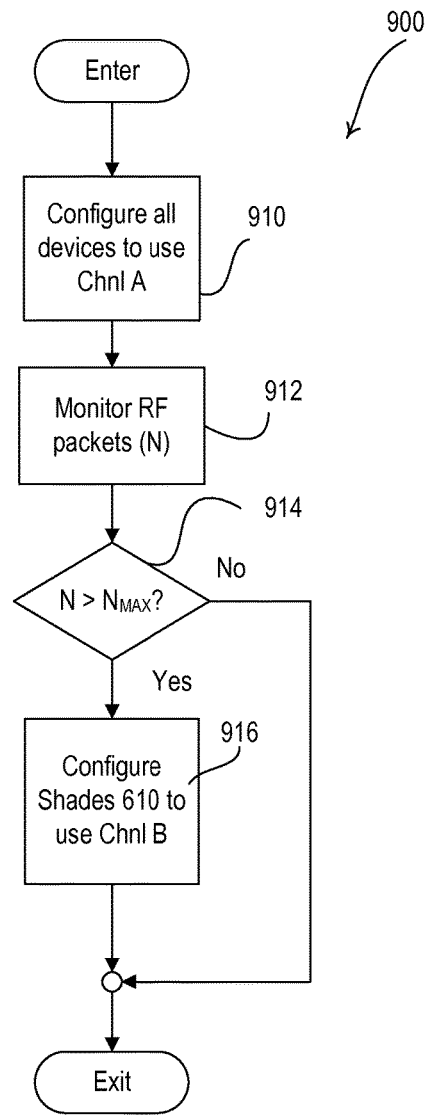
FIG. 17 is a simplified flowchart of an RF monitoring procedure performed by a signal repeater of the load control system of FIG. 12.

FIG. 17 is a simplified flowchart of an RF monitoring procedure 900 performed by a main repeater (e.g., the signal repeater 660A) of the load control system 600. At step 910, the main repeater 660A configures all of the control devices of the load control system 600 to use a given frequency channel (e.g., frequency channel A). At step 912, the main repeater 660A is operable to monitor a number N of RF packets transmitted within a given time frame during normal operation. At step 914, the main repeater 660A compares the number N of RF packets to a predetermined maximum number $N_{MAX}$ to determine whether the load control system 600 has a high amount of traffic on frequency channel A. If the number N of RF packets is greater than the predetermined maximum number $N_{MAX}$ at step 914, the main repeater 660A configures all of the battery-powered motorized window treatments 610 to listen only to an alternate frequency channel (e.g., frequency channel B). Otherwise, the main repeater 660A simply exits the RF monitoring procedure 900 without changing the channel configuration of the battery-powered motorized window treatments 610. Alternatively, the main repeater 660A could simply configure all battery-powered motorized window treatments 610 to use the alternate frequency channel (i.e., frequency channel B) in lieu of executing the RF monitoring procedure 900.

Figure 18:
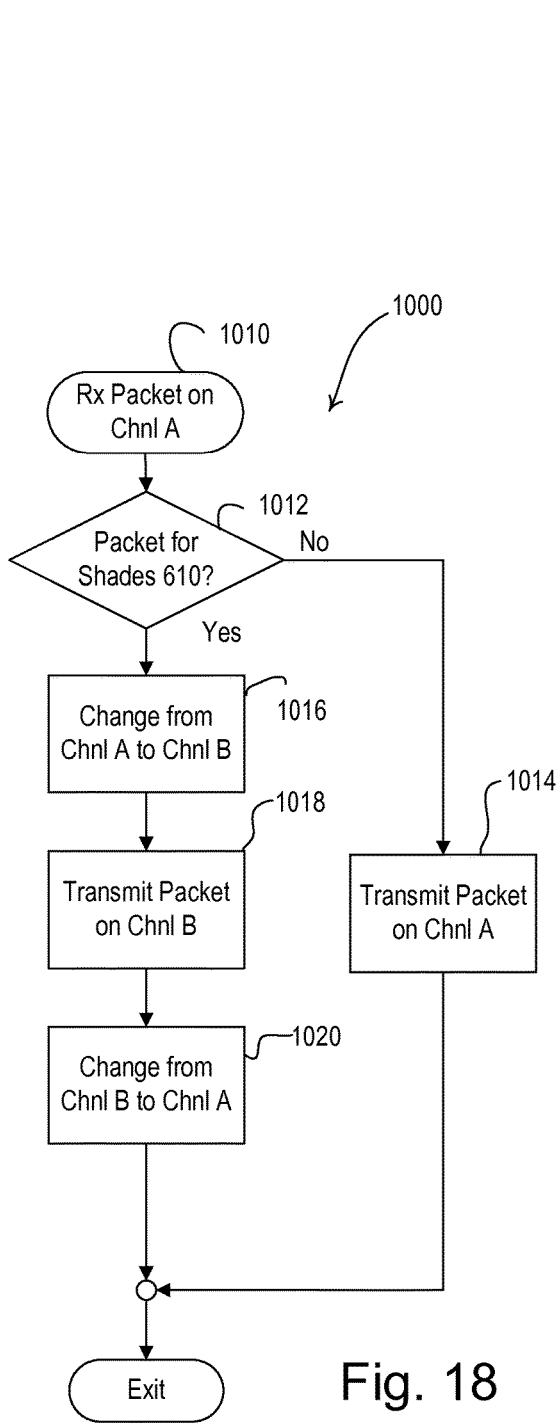
FIG. 18 is a simplified flowchart of an RF signal receiving procedure performed by a signal repeater of the load control system of FIG. 12.

FIG. 18 is a simplified flowchart of an RF signal receiving procedure 1000 performed by the signal repeaters (e.g., the signal repeater 660A) of the load control system 600 during normal operation when an alternate frequency is in use. At step 1010, the signal repeater 660A receives a packet transmitted on frequency channel A. At step 1012, the signal repeater 660A determines whether the received packet is addressed to at least one of the battery-powered motorized window treatments 610. If the packet is not addressed to any of the battery-powered motorized window treatments 610 (e.g., the packet is addressed to the dimmer switch 630), then the repeater 660A simply retransmits the packet on channel A at step 1014 before the RF signal receiving procedure 1000 exits. However, if the signal repeater 660A determines that the received packet is addressed to at least one of the battery-powered motorized window treatments 610, the signal repeater changes its frequency channel from channel A to channel B at step 1016 and transmits the received packet on frequency channel B to the battery-powered motorized window treatments 610 at step 1018. Finally, the signal repeater 660A changes its frequency channel from channel B back to channel A at step 1020 and the RF signal receiving procedure 1000 exits.

Figure 19:
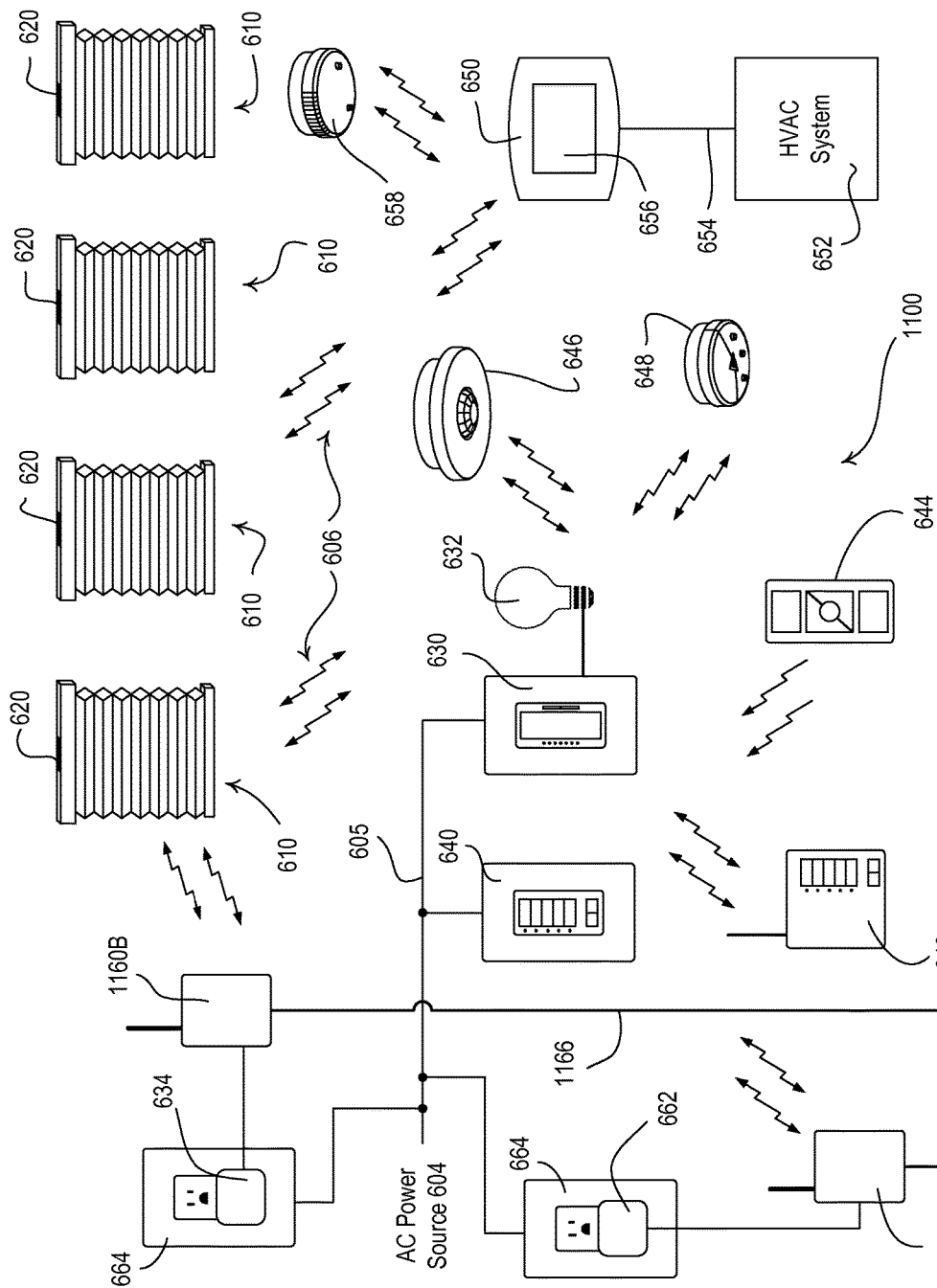
FIG. 19 is a simplified diagram of a RF load control system having two signal repeaters coupled together via a digital communication link according to a third embodiment of the present invention.

FIG. 19 is a simplified diagram of a RF load control system 1100 having two signal repeaters 1160A, 1160B coupled together via a digital communication link 1166 according to a third embodiment of the present invention. The first signal repeater 1160A is configured to transmit and receive packets via the RF signals 606 using only the primary frequency channel A, and the second signal repeater 1160B is configured to transmit and receive packets via the RF signals 606 using only the alternate frequency channel B.

The first and second signal repeaters 1160A, 1160B are operable to transmit digital messages to each other via the digital communication link 1166, which may comprise, for example, a wired communication link, such as an RS-485 link or an Ethernet link, link, or alternatively may comprise a wireless communication link, such as an RF communication link.

In the event that the first signal repeater 1160A receives an packet that is transmitted on channel A and is addressed to at least one of the battery-powered motorized window treatments 610, the signal repeater 1160A transmits a digital message (e.g., including the data from the packet) to the second signal repeater 1160B via the digital communication link 1166. Upon receiving the information via the digital communication link 1160B, the second signal repeater 1160B transmits the packets to the battery-powered motorized window treatments 610 via the RF signals 606 using the alternate frequency B. The packets transmitted to the motorized window treatments 610 by the second signal repeater 1160B include the same (or similar) data as the packets that were received by the first signal repeater 1160A. Thus, the battery-powered motorized window treatments 610 only listen to RF signals 606 transmitted on the alternate frequency channel B distinct from the channel used by the other devices of the load control system 600 in order to further preserve the battery life of the battery-powered window treatments.

Examples of battery-powered remote controls and RF control systems are described in greater detail in commonly-assigned U.S. patent application Ser. No. 12/399,126, filed Mar. 6, 2009, entitled WIRELESS BATTERY-POWERED REMOTE CONTROL HAVING MULTIPLE MOUNTING MEANS; U.S. Pat. No. 7,573,208, issued Aug. 22, 2009, entitled METHOD OF PROGRAMMING A LIGHTING PRESET FROM A RADIO-FREQUENCY REMOTE CONTROL, and U.S. patent application Ser. No. 12/033,223, filed Feb. 19, 2008, entitled COMMUNICATION PROTOCOL FOR A RADIO-FREQUENCY LOAD CONTROL SYSTEM, the entire disclosures of which are hereby incorporated by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A load control device for controlling an electrical load receiving power from a power source in response to RF signals transmitted by an RF transmitter, the RF transmitter adapted to transmit a predetermined number of consecutive packets at a predetermined transmission rate during a given transmission event, each of the packets including a same command and characterized by a packet length, the load control device comprising:

an RF receiver adapted to receive packets from the RF transmitter, the RF receiver operable to be periodically enabled for a sample time period to determine if the RF transmitter is transmitting one of the consecutive packets, the RF receiver operable to enter a sleep mode for a sleep time period between consecutive sample time periods if the RF receiver determines that the RF transmitter is not transmitting one of the consecutive packets during the sample time period; and a controller operatively coupled to the RF receiver, the controller operable to determine that the RF transmitter is transmitting one of the consecutive packets during the sample time period and to subsequently receive an entire packet of the consecutive packets, the controller operable to control the electrical load in response to the entire packet received from the RF transmitter;

wherein the sleep time period of the RF receiver is longer than the packet length of each of the packets, the sample time period of the RF receiver is less than the packet length, and the sample time period and the sleep time period between sample time periods are sized to ensure that the sample time period coincides with at least one packet of the predetermined number of consecutive packets in the transmission event.

2. The load control device of claim 1, wherein:
the controller and the RF receiver are operable to be powered by a battery.

3. The load control device of claim 2, wherein the controller can be controlled into a sleep mode in which the controller consumes less power than in a normal mode.

4. The load control device of claim 3, wherein the RF receiver is operable to determine if detected RF energy exceeds a detect threshold, the RF receiver operable to wake up the controller from the sleep mode to enter the normal mode in response to determining that the detected RF energy exceeds the detect threshold.

5. The load control device of claim 4, wherein the controller is operable to put the RF receiver and the controller to sleep for a snooze time in response to determining that the detected RF energy exceeds the detect threshold, the RF receiver and the controller operable to wake up after the snooze time such that the controller is operable to receive one of the consecutive packets.

6. The load control device of claim 5, wherein the snooze time is slightly less than a break time between two subsequent ones of the consecutive packets.

7. The load control device of claim 4, wherein the controller is operable to adjust the detect threshold of the RF receiver, wherein the detect threshold can be increased to prevent noise signals from causing the RF receiver to wake up the controller thereby conserving battery power.

8. The load control device of claim 7, wherein the controller is operable to adjust the detect threshold from an extended range threshold close to a noise floor to an extended battery mode threshold greater than the extended range threshold.

9. The load control device of claim 2, wherein the electrical load comprises a motor for adjusting a covering material of a motorized window treatment, the load control device comprising:
a motor drive circuit coupled to the motor for driving the motor to thus open and close the covering material.

10. The load control device of claim 9, further comprising:
a drive shaft; and
at least one lift cord rotatably received around the drive shaft and extending to a bottom of the covering material for raising and lowering the covering material;
wherein the motor is operatively coupled to the drive shaft such that the motor is operable to raise and lower the covering material by rotating the drive shaft.

11. The load control device of claim 2, further comprising:
at least one visual indicator operable to display an indication of a state of the load.

12. The load control device of claim 11, wherein the load control device comprises a battery-powered remote control.

13. The load control device of claim 2, wherein the load control device comprises a temperature control device operable to control a heating and/or cooling system in response to the entire packet received from the RF transmitter.

14. The load control device of claim 1, further comprising:
a controllably conductive device adapted to be coupled in series electrical connection between the power source and the electrical load for controlling the power delivered to the electrical load;
wherein the controller is operatively coupled to a control input of the controllably conductive device for controlling the power delivered to the electrical load in response to the entire packet received from the RF transmitter.

15. The load control device of claim 14, further comprising:
a power supply coupled in parallel electrical connection with the controllably conductive device, the power supply operable to conduct a charging current through the electrical load in order to generate a DC supply voltage for powering the controller.

16. The load control device of claim 14, further comprising:
a ground terminal adapted to be coupled to earth ground; and
a power supply adapted to conduct a charging current through the ground terminal in order to generate a DC supply voltage for powering the controller.

17. The load control device of claim 14, wherein the electrical load comprises a lighting load and the load control device comprises a dimmer switch for controlling an amount of power delivered to the lighting load to adjust an intensity of the lighting load.

18. The load control device of claim 1, wherein a packet break time period exists between any two consecutive packets.

19. An RF communication system comprising:
an RF transmitter adapted to transmit a predetermined number of consecutive packets at a predetermined transmission rate during a given transmission event, each of the packets including a same command and characterized by a packet length; and
an RF receiver adapted to receive packets from the RF transmitter, the RF receiver operable to be periodically enabled for a sampling time to determine if the RF transmitter is transmitting one of the consecutive packets, the RF receiver operable to enter a sleep mode for a sleep time period between consecutive sample time periods if the RF receiver determines that the RF transmitter is not transmitting one of the consecutive packets during the sample time period;
wherein, if the RF transmitter is transmitting one of the consecutive packets during the sample time period, the RF transmitter is operable to be enabled to subsequently receive an entire packet of the consecutive packets; and
wherein the sleep time period of the RF receiver is longer than the packet length of each of the packets, the sampling time of the RF receiver is less than the packet length, and the sampling time and the sleep time period between sampling times are sized to ensure that the sampling time coincides with at least one packet of the predetermined number of consecutive packets in the transmission event.

20. The RF communication system of claim 19, further comprising:
a plurality of control devices operable to transmit RF signals transmitted on a first frequency.

21. The RF communication system of claim 20, further comprising:
a signal repeater operable to receive a first RF signal transmitted on the first frequency by one of the control devices, the signal repeater operable to determine that the first RF signal is intended for the RF receiver, the signal repeater operable to change transmission frequencies and transmit a second RF signal related to the first RF signal to the RF receiver on a second frequency different than the first frequency.

22. The RF communication system of claim 21, wherein the signal repeater is operable to determine a number of the plurality of control devices, and to transmit the second RF signal to the RF receiver on the second frequency only if the number of control devices exceeds a threshold amount.

23. The RF communication system of claim 20, further comprising:
a first signal repeater operable to receive a first RF signal transmitted on the first frequency by one of the control devices; and
a second signal repeater adapted to be coupled to the first signal repeater via a communication link;
wherein the first signal repeater is operable to transmit a packet to the second signal repeater via the communication link in response to receiving the first RF signal, the second signal repeater operable to transmit a second RF signal to the RF receiver on a second frequency different than the first frequency in response to receiving the packet from the first signal repeater via the communication link.

24. The RF communication system of claim 23, wherein the communication link comprises a wired communication link.

25. The RF communication system of claim 20, wherein the RF transmitter is operable to transmit the consecutive packets to the RF receiver on a second frequency different than the first frequency.

26. The RF communication system of claim 19, wherein the RF receiver comprises a battery for powering the RF receiver.

27. The RF communication system of claim 26, wherein the RF receiver comprises a battery-powered motorized window treatment for adjusting a position of a covering material.

28. The RF communication system of claim 26, wherein the RF receiver comprises a battery-powered remote control having a visual indicator.

29. The RF communication system of claim 26, wherein the RF receiver comprises a temperature control device operable to control a heating and/or cooling system.

30. The RF communication system of claim 19, wherein the RF receiver comprises a load control device adapted to be coupled in series electrical connection between an AC power source and an electrical load for controlling an amount of power delivered to the electrical load.

31. The RF communication system of claim 30, wherein the load control device comprises a two-wire device adapted to be coupled in series electrical connection between the AC power source and the electrical load without a connection to a neutral side of the AC power source.

32. The RF communication system of claim 30, wherein the load control device comprises a ground terminal adapted to be coupled to earth ground, the load control device operable to conduct a charging current for an internal power supply through the ground terminal.

33. The RF communication system of claim 19, wherein the RF transmitter comprises at least one of a battery-powered remote control, an occupancy sensor, a vacancy sensor, a daylight sensor, a temperature sensor, a humidity sensor, a security sensor, a proximity sensor, a keypad, a key fob, a cell phone, a smart phone, a tablet, a personal digital assistant, a personal computer, a timeclock, an audio-visual control, a safety device, and a central control transmitter.

34. The RF communication system of claim 19, wherein a packet break time period exists between any two consecutive packets.

35. A wireless signal receiver comprising:
a wireless receiver circuit for detecting transmitted signals transmitted in a predetermined number of consecutive packets during a given transmission event, where each packet comprises a same data, there being a packet time and a time between packets longer than the packet time; and
a control circuit operable to turn on the wireless receiver circuit for an on-time, the on-time being less than an off-time of the wireless receiver circuit, the on-time of the wireless receiver circuit being less than the packet time, the off-time between on-times being less than the time between packets and the off-time being longer than the packet time, the control circuit operable to determine that the wireless receiver circuit is receiving one of the consecutive packets during the on-time and to subsequently receive an entire packet of the consecutive packets;
wherein the off-time and the on-time are selected so that within the plurality of packets, the on-time will coincide with the packet time to ensure that the wireless receiver circuit detects at least one packet during the transmission of the predetermined number of packets if packets are being transmitted.

36. The wireless signal receiver of claim 35, wherein the wireless receiver circuit comprises an RF receiver circuit.

37. The wireless signal receiver of claim 36, further comprising:
an antenna coupled to the RF receiver circuit; and
a filter circuit comprising a SAW filter coupled between the antenna and the RF receiver circuit and operable to filter out frequencies outside of a defined frequency range;
wherein said RF receiver circuit is operable to remain on if an RF signal is detected, and said filter circuit is operable to prevent said RF receiver circuit from remaining on or turning on again for RF signals outside of said the defined frequency range, thereby conserving battery power.

38. The wireless signal receiver of claim 37, wherein the RF receiver circuit is operable to turn on a control circuit in response to detecting the RF signal.

39. The wireless signal receiver of claim 35, wherein the on-time is approximately 0.1 msec, the off-time is approximately 40 msec, the packet time is approximately 5 msec and the time between packets is approximately 75 msec.

40. The wireless signal receiver of claim 39, wherein the predetermined number of packets comprises twelve.

41. The wireless signal receiver of claim 35, further wherein the wireless receiver circuit is battery powered and further comprising an adaptive circuit operable to change the off-time of said wireless receiver circuit.

42. A method of communicating in a load control system, the method comprising:
transmitting by an RF transmitter during a given transmission event a predetermined number of consecutive packets at a predetermined transmission rate, each of the packets including a same command and characterized by a packet length;
periodically enabling an RF receiver for a sample time period to determine if the RF transmitter is transmitting one of the packets;
if the RF transmitter is not transmitting one of the consecutive packets during the sample time period, putting the RF receiver in a sleep mode for a sleep time period between consecutive sample time periods; and
if the RF transmitter is transmitting one of the consecutive packets during the sample time period, enabling the RF receiver to subsequently receive an entire packet of the consecutive packets;
wherein the sleep time period of the RF receiver is longer than the packet length of each of the packets, the sample time period of the RF receiver is less than the packet length, and the sample time period and the sleep time period between sample time periods are sized to ensure that the sample time period coincides with at least one packet of the predetermined number of consecutive packets in the transmission event.

43. The method of claim 42, further comprising:
the RF receiver determining if detected RF energy exceeds a detect threshold; and
the RF receiver waking up a controller from a sleep mode to enter a normal mode in response to determining that the detected RF energy exceeds the detect threshold.

44. The method of claim 43, further comprising:
the controller putting the RF receiver and the controller to sleep for a snooze time in response to determining that the detected RF energy exceeds the detect threshold;
the RF receiver and the controller waking up after the snooze time, the snooze time less than a break time between two subsequent ones of the consecutive packets; and
the controller subsequently receiving the entire packet transmitted by the RF transmitter.

45. The method of claim 44, further comprising:
the controller controlling an amount of power delivered to an electrical load in response to the entire packet received from the RF transmitter.

46. The method of claim 43, further comprising:
the controller adjusting the detect threshold of the RF receiver whereby the detect threshold can be increased to prevent noise signals from causing the RF receiver to wake up the controller thereby conserving battery power.

47. The method of claim 42, wherein a packet break time period exists between any two consecutive packets.

48. A wireless signal receiver circuit for detecting wireless control signals and having an on/off operation to conserve power comprising:
a control circuit;
a wireless receiver having an on state when it consumes power and an off state when it consumes less power than consumed in the on state, the on state having a duration substantially shorter than the off state, whereby the wireless receiver receives wireless control signals during the on state to be processed by the control circuit, the wireless control signals being sent in packets with a packet time such that there is a predefined time between packets; and
wherein the wireless receiver is operable to periodically be in the on state for a sample time substantially less than the packet time to detect a wireless control signal, whereby upon detecting a first packet during the sample time, the wireless receiver is operable to enter the off state to conserve power for an amount of time slightly less than the predefined time between packets, to subsequently turn on and remain on until a succeeding packet starts to be received, and to turn off after the succeeding packet is fully received.

49. The wireless signal receiver circuit of claim 48, wherein the control circuit has an on state when it consumes power and an off state when it consumes less power than consumed in the on state, the wireless receiver operable to cause the control circuit to enter the on state in response to detecting the wireless control signals.

50. The wireless signal receiver circuit of claim 49, wherein upon the wireless receiver detecting the first packet, the control circuit is operable to determine that the wireless receiver did not receive the first packet in its entirety.

51. The wireless signal receiver circuit of claim 50, wherein upon the control circuit determining that the wireless receiver did not receive the first packet in its entirety, the control circuit is operable to cause the wireless receiver to enter the off state and to enter the off state itself to conserve power for an amount of time slightly less than the predefined time between packets.

52. The wireless signal receiver circuit of claim 48, wherein the wireless control signals are RF signals.

53. The wireless signal receiver circuit of claim 48, wherein the control circuit comprises a microprocessor.

54. The wireless signal receiver circuit of claim 48, wherein if the wireless receiver does not detect a wireless signal during the on state, the wireless receiver turns off until a next on state.

55. A system for conserving battery power of a battery powered wireless signal receiver comprising:

a wireless signal receiver that periodically turns on to determine if a wireless signal is being transmitted, the wireless signal receiver being capable of receiving on any of multiple channels, the wireless signal receiver including a control circuit that determines if the wireless signal is intended for the wireless signal receiver; and a transceiver circuit for retransmitting said wireless signals, the transceiver circuit determining a number of transmitted wireless signals, and if the number exceeds a threshold amount, said transceiver circuit communicating with the wireless signal receiver to change the channel of communication to an alternate channel and retransmitting wireless signals intended for the wireless signal receiver on the alternate channel, whereby the wireless signal receiver will receive fewer wireless signals on the alternate channel, thereby remaining on for less time and reducing battery power consumption.

56. The system of claim 55, wherein the transceiver comprises a repeater for retransmitting the wireless signals from a plurality of transmitting devices.

57. The system of claim 56, wherein the repeater automatically switches to a less used alternate channel when the threshold amount is exceeded.

58. The system of claim 56, wherein the plurality of transmitting devices include at least one transmitter for controlling a battery powered motorized window treatment.

59. The system of claim 56, wherein the multiple channels have different carrier frequencies.

60. The system of claim 55, wherein the wireless signals are RF signals.

* * * * *